United States Patent
Kwak et al.

(10) Patent No.: US 7,583,635 B2
(45) Date of Patent: *Sep. 1, 2009

(54) ESTABLISHING NETWORK ADDRESS OF MOBILE TERMINAL IN MOBILE COMMUNICATION SYSTEM

(75) Inventors: Yong Won Kwak, Anyang-si (KR); Yong Ho Kim, Bucheon-si (KR); Jin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 507 days.

This patent is subject to a terminal disclaimer.

(21) Appl. No.: 11/357,807

(22) Filed: Feb. 16, 2006

(65) Prior Publication Data

US 2006/0187881 A1    Aug. 24, 2006

(30) Foreign Application Priority Data

Feb. 18, 2005    (KR) ............... 10-2005-0013707
Apr. 29, 2005    (KR) ............... 10-2005-0036428

(51) Int. Cl.
    H04W 4/00      (2009.01)
    H04W 36/00     (2006.01)
    H04L 12/28     (2006.01)
(52) U.S. Cl. ............... 370/331; 370/338; 370/395.52; 455/436
(58) Field of Classification Search ............... 370/331, 370/338, 395.62; 455/436
    See application file for complete search history.

(56) References Cited

U.S. PATENT DOCUMENTS

2004/0077341 A1* 4/2004 Chandranmenon et al. .. 455/418
2004/0092264 A1* 5/2004 Koodli et al. ............... 455/436
2004/0137903 A1   7/2004 Park
2004/0196808 A1* 10/2004 Chaskar et al. ............. 370/331
2005/0037757 A1   2/2005 Moon
2006/0140150 A1* 6/2006 Olvera-Hernandez et al. .......... 370/331
2007/0204155 A1* 8/2007 Dutta et al. ................. 713/168

FOREIGN PATENT DOCUMENTS

| EP | 1 460 815 A1 | 9/2004 |
| EP | 1460815 A1 | 9/2004 |
| JP | 2004-007072 | 1/2004 |
| JP | 2004-007072 A | 1/2004 |

* cited by examiner

Primary Examiner—Alpus H Hsu
Assistant Examiner—Saad Hassan
(74) Attorney, Agent, or Firm—Lee, Hong, Degerman, Kang & Waimey

(57) ABSTRACT

The present invention relates to establishing a network address of a mobile terminal in a mobile communication system when the mobile terminal is handed over from one network to another. Preferably, the present invention establishes a unified interface to an upper layer of the mobile terminal for managing messages to and from at least one of a homogeneous network and a heterogeneous network, performs handover of the mobile terminal to at least one of a homogeneous network and a heterogeneous network, receives in the upper layer a request from the unified interface for establishing a network address of the mobile terminal for the at least one of a homogeneous network and a heterogeneous network for communicating data, and establishes the network address for the at least one of a homogeneous network and a heterogeneous network.

50 Claims, 26 Drawing Sheets

① Movement Detection
② Acquire a CoA
③ Transmit Binding Update
④ Combine Addresses and Transmit a Back

ESTABLISHING NETWORK ADDRESS OF MOBILE TERMINAL IN MOBILE COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. P05-013707, filed on Feb. 18, 2005 and Korean Application No. P05-036428, filed on Apr. 29, 2005, the contents of which are hereby incorporated by reference herein in their entirety.

FIELD OF THE INVENTION

The present invention relates to establishing a network address of a mobile terminal in a mobile communication system, and more particularly to establishing the network address when a mobile terminal is handed over from one network to another.

BACKGROUND OF THE INVENTION

Currently, standards committee IEEE 802.21 conducts intensive research into the international standards associated with media independent handover (MIH) between heterogeneous networks. MIH provides not only a seamless handover but also a service continuity between the heterogeneous networks, resulting in greater convenience for a user who carries a mobile terminal. IEEE 802.21 defines a variety of functions (e.g., an MIH function, an event service, a command service, and an information service (IS) function) as basic requirements.

A mobile terminal is indicative of a multi-mode node for supporting at least two interface types. For example, the multi-mode node can support a variety of interface types, such as a wired interface type (also called a wire-line interface type) such as the Ethernet based on an IEEE 802.3 standard specification, a wireless interface type based on IEEE 802.XX standard specifications (e.g., a broadband wireless access network system, a wireless LAN, a wired LAN, and a cellular system interface), and other interface types defined by a cellular standardization organization (e.g., 3GPP or 3GPP2).

A general Media Independent Handover Function (MIHF) reference model is depicted in FIG. 1. In the figure, MIHF architecture for interaction with other layers and with the remote MIHG is illustrated. In order for the MIHF to provide asynchronous and synchronous services to lower layers and higher layers, Service Access Points (SAPs) such as MIH_MGMT_SAP, MIH_SME_SAP and MIH_SAP along with primitives are defined. MIH_MGMT_SAP defines the interface between the MIHF and the management plane (Management Entity) of different network interfaces and is used for transporting MIH protocol messages between the MIHF and local link layer entities as well as peer MIHF entities. MIH_SAP defines the interface between the MIHF and higher layer entities such as device manager, handover policy control function, transport, layer 3 (L3) mobility management protocol, etc., and is used for MIH configuration and operation. MIH_SME_SAP defines the interface between the MIHF and the Station Management Entity or the Network Management System, and is used for MIG configuration and operation.

FIG. 2 is a structural diagram illustrating a multi-mode mobile terminal. Referring to FIG. 2, the multi-mode mobile terminal includes a physical (PHY) layer and a Medium Access Control (MAC) layer for individual modes, and locates a Media Independent Handover (MIH) layer under the IP layer.

Media Independent Handover (MIH) must be defined between IEEE 802-series interfaces, or must be defined between an IEEE 802-series interface and a non-802-series interface (e.g., 3GPP and 3GPP2). Also, a protocol for supporting mobility of upper layers such as a mobile IP and a Session Initiation Protocol (SIP) must be supported for a handover function and continuity of services.

The MIH function is located under the IP layer, and facilitates a handover process using input values (e.g., a trigger event and information associated with other networks) received from a second layer (Layer 2). The MIH function may include a plurality of input values based on both user policy and configuration which may affect the handover process. General interfaces among the mobile IP, a third layer (Layer 3) entity such as an SIP (Session Initiation Protocol), and the MIH layer are defined. In this case, the aforementioned interfaces provide the first layer (i.e., the physical layer), the second layer (i.e., the MAC layer), and mobility management information. The MIH function acquires information associated with a lower layer and a network using event and information service (IS) functions.

An upper layer includes an upper management entity for monitoring states and operations of various links contained in a mobile terminal, such that it performs a handover control function and a device manager function. In this case, the handover control function and the device manager may be located at different locations independent of each other, or the handover control function and the device manager may be included as the upper management entities in the upper layer.

A network structure for supporting a mobile IP includes a Home Agent (HA), a Foreign Agent (FA), and a Mobile Subscriber Station (MSS). A variety of functions are required to operate the mobile IP, i.e., an agent discovery function, a registration function, and a routing function.

The agent discovery function is indicative of a method for allowing a mobile terminal to determine whether the mobile terminal is connected to its own home network or a foreign network, such that the mobile terminal can recognize whether the mobile terminal itself has moved to another network.

According to the registration function, if the mobile terminal moves to another network, it transmits current location information to the home agent, and allows the mobile terminal to receive services from the home network without any change, in such a way that the registration function provides a highly adaptable mechanism.

The routing function defines a variety of functions required for properly routing a datagram transmitted/received to/from the mobile terminal when the mobile terminal is connected to or accesses a foreign network.

The mobile IP provides two registration procedures fore establishing a temporary address or Care of Address (CoA) when the mobile terminal moves to another subnet. For example, the two registration procedures are FA-CoA and co-located CoA.

If the FA-CoA is used, the CoA is supplied from a foreign agent (FA) via an agent advertisement message, and an IP address of the foreign agent (FA) is used as a temporary address (CoA). If the co-located CoA is used, the mobile terminal receives a temporary address (CoA) via a DHCP (Dynamic Host Configuration Protocol) server located at the foreign network.

The DHCP is indicative of a protocol which allows network managers to centrally manage/allocate necessary IP addresses in a network contained in their organization. When computer users gain access to the Internet in an organization, the IP address must be assigned to individual computers. When the network manager centrally manages/allocates the IP address, and a computer is connected to the Internet at other places outside of the network, the DHCP automatically transmits a new IP address.

The DHCP employs a rental (or lease) scheme for controlling a given IP address to be valid at a corresponding computer during a predetermined period of time only. A lease time may be changed according to an Internet access time required by a user at a specific location. The DHCP may also reduce the IP-address lease time when many more computers than available IP addresses are used, such that it can dynamically reconstruct a network.

If a system starts its operation, a plurality of clients request unique IP addresses for their systems from the DHCP server. If the clients receive their IP addresses from the DHCP server, the TCP/IP setup is initialized, and the clients communicate with other hosts using a TCP/IP protocol. The DHCP server answers an IP address lease request of a DHCP client, such that it maintains/manages the scope of allocatable IP addresses (e.g., 203.224.29.10~203.224.29.100).

The following Table 1 shows a DHCP message format.

TABLE 1

| 0 | 8 | 16 | 24 | 31 |
|---|---|---|---|---|
| OP | HTYPE | HLEN | | HOPS |
| TRANSACTION IDENTIFIER | | | | |
| SECONDS ELAPSED | | | FLAGS | |
| CLIENT IP ADDRESS | | | | |
| YOUR IP ADDRESS | | | | |
| SERVER IP ADDRESS | | | | |
| ROUTER IP ADDRESS | | | | |
| CLIENT HARDWARE ADDRESS (16 OCTETS) | | | | |
| . . . | | | | |
| SERVER HOST NAME (64 OCTETS) | | | | |
| . . . | | | | |
| BOOT FILE NAME (128 OCTETS) | | | | |
| . . . | | | | |
| OPTIONS (VARIABLE) | | | | |
| . . . | | | | |

The following Table 2 shows various types and usages of the DHCP messages.

TABLE 2

| Message | Use |
|---|---|
| DHCPDISCOVER | Client broadcast to locate available servers. |
| DHCPOFFER | Server to client in response to DHCPDISCOVER with offer of configuration parameters. |
| DHCPREQUEST | Client message to servers either (a) requesting offered parameters from one server and implicitly declining offers from all others, (b) confirming correctness of previously allocated address after, e.g., system reboot, or (c) extending the lease on a particular network address. |
| DHCPACK | Server to client with configuration parameters, including committed network address. |
| DHCPNAK | Server to client indicating client's notion of network address is incorrect (e.g., client has moved to new subnet) or client's lease as expired |
| DHCPDECLINE | Client to server indicating network address is already in use. |
| DHCPRELEASE | Client to server relinquishing network address and canceling remaining lease. |
| DHCPINFORM | Client to server, asking only for local configuration parameters; client already has externally configured network address. |

The principal components for mobile IPv6 system operations, and functions of individual principal components will hereinafter be given.

A mobile node (MN) is a host or router for switching its network access. A correspondent node (CN) is a host or router communicating with the mobile node (MN). The home agent (HA) acts as a router and has registration information of the mobile node (MN) obtained from routers contained in a home network. Accordingly, the home agent (HA) can transmit a datagram to a current position of the mobile node (MN) contained in a foreign network.

The temporary address or Care of Address (CoA) is indicative of an IP address connected to a mobile node when the mobile node moves to a foreign node or foreign agent (FA). The term "Binding" is indicative of a specific operation in which the mobile node matches the CoA registered in the home agent with a home address of a corresponding node. A "Binding Update (BU)" message is indicative of a message used when the mobile node itself informs the home agent (HA) and the correspondent node (CN) of a CoA of the mobile node. A "Binding Acknowledge (BACK)" message is indicative of a response message to the aforementioned "BU" message. A "Binding Request (BR)" message is indicative of a message for requesting the "BU" message when the correspondent node (CN) does not receive the "BU" message until a timer for the binding information of the mobile node expires.

The mobile node (MN) automatically constructs its location information while in motion using a neighbor discovery function and an address auto-configuration function. If a correspondent node (CN) stores the binding information, the correspondent node (CN) directly communicates with the mobile node without passing through the home agent in such a way that a Router Optimization is performed.

An IP address auto-configuration method is classified into two address auto-configuration methods such as a state-maintenance-type address auto-configuration method for acquiring an address using a server such as the DHCP server, and a non-state-type address auto-configuration method for controlling a host so that the mobile node can generate an address by itself.

The state-maintenance-type address auto-configuration method is adapted to assign one of a plurality of addresses capable of being assigned from the server to the host on the condition that the host requests an address from the DHCP server. The non-state-type address auto-configuration method combines the mobile node's interface ID information with either prefix information acquired from the router or well-known prefix information, such that the mobile node forms an address.

DHCPv6 is indicative of a DHCP protocol for the IPv6 system, and supports the state-maintenance-type address auto-configuration method. The DHCPv6 is indicative of a specific mechanism by which an IP address, various information (e.g., routing information), and a network resource management function are concentrated on a small number of DHCP servers, resulting in reduction of maintenance costs.

The DHCPv6 employs two multicast addresses, such as an "All_DHCP_Relay_Agents_and_Servers" address and an "All_DHCP_Servers" address.

The "All_DHCP_Relay_Agents_and_Servers" address is indicative of a link local multicast address used by the client, such that the client communicates with the agent contained in a link on the condition that a link local address of the agent is unknown. In this case, all servers and agents act as members of the above multicast group.

The "All_DHCP_Servers" address is indicative of a site local multicast address, which is used by a client or a relay when the client or the relay transmits a message to all servers or does not recognize unicast addresses of the servers, such that the client or the relay can communicate with the server. In order to allow the client to use the above-mentioned "All_DHCP_Servers" address, the client must have addresses of sufficient ranges at which the server arrives. In this case, all servers contained in a site act as members of the above-mentioned multicast group.

A variety of messages can be used for basic operations of the DHCPv6, for example, a "SOLICIT" message, an "ADVERTISE" message, a "REQUEST" message, a "REPLY" message, a "RENEW" message, and a "RELEASE" message.

The "SOLICIT" message is adapted for the client to recognize location information of the server, and is multitasked using the "All_DHCP_Servers" address. The "ADVERTISE" message is indicative of a response message to the "SOLICIT" message. If possible, the DHCP server answers the "SOLICIT" message. The "REQUEST" message is adapted to acquire constituent parameters equipped with an IP address from the server selected by the client, and is multitasked using the "All_DHCP_Relay_Agents_and_Servers" address. The "REPLY" message is indicative of a response message to the aforementioned "REQUEST", "RENEW", and "RELEASE" messages. The "RENEW" message is indicative of a message required when the client acquires an initially-allocated client address and the lifetime of the constituent parameters. The "RELEASE" message is indicative of a message required when the client returns at least one IP address to the server.

FIG. 3 shows an MIH structure and a transmission protocol. A heterogeneous network and a handover technique will hereinafter be described with reference to FIG. 3. Referring to FIG. 3, the MIH function is located under the IP layer, and facilitates a handover process using input values (e.g., a trigger event and information associated with other networks) received from a second layer (Layer 2).

The MIH function may include a plurality of input values based on both user policy and configuration which may affect the handover process. General interfaces among the mobile IP, a third layer (Layer 3) entity such as an SIP (Session Initiation Protocol), and the MIH layer are defined. In this case, the aforementioned interfaces provide the first layer (i.e., the physical layer), the second layer (i.e., the MAC layer), and mobility management information. The MIH function acquires information associated with a lower layer and a network using event and information service (IS) functions. Accordinglhy, the upper layer must include the MIH function for monitoring/controlling states of various links contained. Dotted lines of FIG. 3 are indicative of primitive information and an event trigger, for example.

FIG. 4 is a block diagram illustrating an event trigger. In order to quickly perform a handover function, a network layer must use information generated from a link layer, such that the network layer can quickly re-establish a connection state. The link layer event is adapted to predict the movement of a user, and helps a mobile terminal and a network to prepare the handover function.

Referring to FIG. 4, a trigger for the handover may be initiated from the physical (PHY) layer and the MAC layer. A source of the trigger may be determined to be a local stack or a remote stack. An event trigger provides state information of a current signal, state change information of another network, and future predicted change information. The event trigger also includes change information of the physical and MAC layers or attribute change information of a specific network.

The event types can be classified into a physical (PHY) layer event, a MAC layer event, a management event, a third layer (L3) event, and an application event, for example.

FIG. 5 shows triggers generated until a link setup process from a current access link to a new link is performed. Basic trigger events (i.e., "Link_Up" event, "Link_Down" event, "Link_Going_Down" event, "Link_Going_Up" event, "Link_Event_Rollback" event, "Link_Available" event, "Link_Parameters_Change" event, "IP_Renewal_Indication" event, and "IP_Renewal_Request" event, for example) will hereinafter be described with reference to FIG. 5.

A "Link_Up" event occurs when a second layer (L2) connection is established on a specific link interface and an upper layer is able to transmit third layer (L3) packets. In this case, it is determined that all L2 layers contained in a link have been completely configured. A source of the "Link_Up" event corresponds to a "Local MAC" and a "Remote MAC". The following Table 3 shows parameters of the "Link_Up" event.

TABLE 3

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |
| MacNewAccessRouter | MAC Address | MAC address of new access router |
| NetworkIdentifier | Media Specific | Network ID used for detecting subnet change |

A "Link_Down" event occurs when the L2 connection is released on a specific interface and L3 packets cannot be transmitted to a destination. The source of the "Link_Down" event is indicative of a local MAC. The following Table 4 shows parameters of the "Link_Down" event.

TABLE 4

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |

TABLE 4-continued

| Name | Type | Description |
| --- | --- | --- |
| ReasonCode | | Reason for released link |

A "Link_Going_Down" event occurs when it is expected that the L2 connection will enter a "Link_Down" state within a predetermined time, and may serve as a signal for initializing a handover procedure. A source of the "Link_Going_Down" corresponds to a "Local MAC" and a "Remote MAC". The following Table 5 shows parameters of the "Link_ Going_Down" event.

TABLE 5

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacOldAccessRouter | MAC Address | MAC address of old access router |
| MacNewAccessRouter | MAC Address | MAC address of new access router |
| TimeInterval | Time in msecs | Predicted Link_Down time of link |
| ConfidenceLevel | % | Link_Down level predicted at specific time |
| UniqueEventIdentifier | | Use in event rollback occurrence |

A "Link_Going_Up" event occurs when it is expected that the L2 connection will enter a "Link_Up" state within a predetermined time, and is used when a long period of time is consumed to initialize a network. A source of the "Link_Going_Up" event corresponds to a "Local MAC" and a "Remote MAC". The following Table 6 shows parameters of the "Link_ Going_Up" event.

TABLE 6

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| TimeInterval | Time in msecs | Predicted Link_UP time of link |
| ConfidenceLevel | % | Link_UP level predicted at specific time |
| UniqueEventIdentifier | | Use in event rollback occurrence |

A "Link_Event_Rollback" event is formed by combining the "Link_Going_Down" event with the "Link_Going_Up" event. The "Link_Event_Rollback" event is indicative of a trigger generated when it is expected that the "Link_UP" event or "Link_Down" event will not be generated any more within a specific time on the condition that the "Link_Going_Up" event or "Link_Going_Down" event are transmitted to a destination. A source of the "Link_Event_Rollback" event corresponds to a "Local MAC" and a "Remote MAC". The following Table 7 shows parameters of the "Link_Event_Rollback" event.

TABLE 7

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| UniqueEventIdentifier | | Use in event rollback occurrence |

A "Link_Available" event is indicative of an available state of a new specific link, and indicates the possibility of allowing a new base station (BS) or a new Point of Attachment (POA) to provide a link superior in quality as compared to a current BS or a current POA to which a current mobile terminal is connected. A source of the "Link_Available" event corresponds to a "Local MAC" and a "Remote MAC". The following Table 8 shows parameters of the "Link_Available" event.

TABLE 8

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile Terminal |
| MacNewAccessRouter | MAC Address | MAC address of new access router |
| MacOldAccessRouter | MAC Address | MAC address of old access router |

A "Link_Parameter_Change" event is indicative of an event generated when a change of a link parameter value is higher than a specific threshold level. The "Link_Parameter_Change" event includes link layer parameters, for example, a link speed (i.e., a link rate), a QoS (Quality of Service), and an encrypted value, etc. A source of the "Link_Parameter_Change" event corresponds to a "Local MAC" and a "Remote MAC". The following Table 9 shows parameters of the "Link_ Parameter_Change" event.

TABLE 9

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| MacMobileTerminal | MAC Address | MAC address of Mobile |

TABLE 9-continued

| Name | Type | Description |
|---|---|---|
| MacAccessRouter | MAC Address | Terminal MAC address of new access router |
| oldValueOfLinkParameter | | Old value of link parameters |
| newValueOfLinkParameter | | New value of link parameters |

An information service (IS) provides detailed information associated with a network required for both network discovery and network selection, and must be designed to be freely accessed by a user over any network. The information service must include a variety of information components, for example, a link access parameter, a security mechanism, a neighborhood map, a location, information indicative of a service provider and other access information, and a link cost (i.e., cost of link).

FIG. 6 is a structural diagram illustrating a "Link Event" model and an "MIH Event" model. Referring to FIG. 6, the MIH event is indicative of an event transmitted from the MIH to either the upper management entity or the upper layer, and corresponds to conventional event triggers. The link event is indicative of an event transmitted from a lower layer (i.e., a MAC layer or a physical (PHY) layer) to the MIH, and uses primitives for use in individual interface MAC- or physical-layers.

FIG. 7 is a structural diagram illustrating a "Remote Link Event" model. Referring to FIG. 7, if a lower layer (MAC or PHY) contained in a local stack generates a link event and transmits the link event to the MIH contained in a local stack, the MIH of the local stack transmits the link event to the MIH of a remote stack.

FIG. 8 is a structural diagram illustrating a "Remote MIH Event" model. Referring to FIG. 8, the MIH function of the local stack generates a remote MIH event, and transmits the remote MIH event to a counterpart MIH function contained in a remote stack. The MIH function of the remote stack transmits the received event to an upper management entity or an upper layer contained in the remote stack. Similarly, the MIH function of the remote stack generates an event to the MIH function of the local stack, and the MIH function of the local stack transmits the aforementioned event to the upper layer of the local stack.

FIG. 9 is a structural diagram illustrating an "MIH command" model and a "Link command" model. Referring to FIG. 9, the MIH command is generated from the upper management entity or the upper layer, and is then transmitted to the MIH function, such that it commands the MIH to perform a specific task. The link command is generated from the MIH function, and is then transmitted to the lower layer, such that it commands the lower layer to perform a specific task.

FIG. 10 is a structural diagram illustrating a "Remote MIH command" model. Referring to FIG. 10, the remote MIH command is generated from the upper management entity or the upper layer, and is then transmitted to the MIH function. The MIH function transmits the received MIH command to a counterpart MIH function contained in a remote stack. Similarly, the upper layer contained in the remote stack generates a command and transmits the command to the MIH function of the remote stack, and the MIH function of the remote stack transmits the command to the MIH function of the local stack.

FIG. 11 is a structural diagram illustrating a "Remote Link Command" model. Referring to FIG. 11, the MIH function contained in the local stack generates a remote link command, and transmits the remote link command to a counterpart MIH function contained in a remote stack. The MIH function contained in the remote stack transmits the remote link command to a lower layer contained in the remote stack. Similarly, the MIH function contained in the remote stack generates a command, and transmits the command to the MIH function of the local stack, and the MIH function of the local stack transmits the command to the lower layer of the local stack.

FIG. 12 is a diagram illustrating operations of a mobile IPv4 system. Referring to FIG. 12, the mobile IPv4 additionally requires a variety of functions (i.e., a mobile host function, a home agent (HA) function, and a foreign agent (FA) function), such that it can provide the upper layer with clear mobility.

However, if a router or path is not optimized, there is no need for a correspondent node communicating with the mobile terminal to be changed to another. In this case, the mobile host is indicative of an IP host at which the mobility is supported. The home agent maintains location information associated with the mobile host, and serves as a router for performing tunneling of the mobile host. The foreign agent is indicative of a router for supporting the mobility over a foreign network.

Operations of the mobile IPv4 system shown in FIG. 12 will hereinafter be described. Referring to FIG. 12, the mobile host moves from its home network to a foreign network at step S111. The mobile host then receives an advertisement message currently broadcast over the foreign network, such that the mobile host recognizes that it has moved. Thereafter, the mobile host registers a temporary address or Care of Address (CoA) indicative of a current location of the mobile host in the home agent (HA) of the home network at step S112.

In this case, the temporary address (CoA) may be equal to an IP address (i.e., foreign agent (FA)-CoA) of the foreign agent, or may be equal to a co-located CoA, which is temporarily assigned to the mobile host via the DHCP in the foreign network.

Packets transmitted from an external part to the mobile host are transmitted to the home network. These packets are intercepted by the home agent recognizing the movement of the mobile terminal at step S113. The home agent having intercepted the above packets sets a destination address of the packets transmitted to the mobile host to an address of the foreign agent (FA) on the condition that the FA-CoA is used, encapsulates the destination address indicative of the FA address, and transmits the encapsulated address at step S114.

Thereafter, the encapsulated transmission packets are transmitted to the foreign agent (FA). The foreign agent (FA) then de-capsulates the received packets to recover original packets, and finally transmits the original packets to the mobile host at step S115.

Notably, packets transmitted from the mobile host to the correspondent host may be directly transmitted via the foreign agent (FA). If an ingress filtering problem occurs, the above-mentioned packets may also be transmitted via a reverse tunnel.

The principal functions required for the mobile IP are an agent discovery function, a registration function, and a routing function, for example, and their detailed description will hereinafter be described.

Agent discovery is indicative of a method for allowing a mobile terminal to determine whether the mobile terminal is connected to its own home network or a foreign network, such that the mobile terminal can recognize whether the mobile terminal itself has moved to another network.

A mobile IP extends a conventional ICMP (Internet Control Message Protocol) Router Discovery (i.e., IETF RFC 1256) to discover a desired agent. An agent advertisement message periodically broadcast by the agents (i.e., home agent, and foreign agent) includes a "Mobility Agent Advertisement Extension" message in an "ICMP Router Advertisement" message, and transmits the "ICMP Router Advertisement" message including the "Mobility Agent Advertisement Extension" message. An "Agent Solicitation" message transmitted when the mobile terminal searches for an agent employs the same method as in a conventional "ICMP Router Solicitation" message.

If the mobile terminal moves to another network, the registration function transmits current location information to the home agent, and allows the mobile terminal to receive services from the home network without any change.

The mobile IP provides two registration procedures, for example, FA-CoA and co-located CoA. If the mobile terminal uses the FA-CoA, the mobile terminal performs registration via the foreign agent (FA). If the mobile terminal uses the co-located CoA, the mobile terminal directly performs registration to the home agent.

The routing function defines a variety of functions required for properly routing a datagram transmitted/received to/from the mobile terminal when the mobile terminal is connected to or accesses a foreign network. The datagram includes a unicast packet, a multicast packet, and a broadcast packet.

DHCP operations will hereinafter be described. In order to correctly operate the DHCP, at least one DHCP server and a single DHCP client must be included in a corresponding network. Also, the network must further include not only the scope of a TCP/IP address but also a gateway address and a subnet mask. The DHCP client acquires the TCP/IP address information from the DHCP server while in operation. However, it should be noted that the acquired TCP/IP address is not permanent. The DHCP server provides a client with a lease address which may periodically expire or be periodically updated.

There are a plurality of client DHCP states, i.e., an initialization state (INT), a selecting state (SELECTING), a requesting state (REQUESTING), a binding state (BOUND), a renewing state (RENEWING), and a re-binding state (REBINDING), etc. The DHCP client acquires/maintains the lease address via a plurality of handshake steps, each of which is referred to as a state.

FIG. 13 is a flow chart illustrating operations of a DHCP client-server model, and shows a method for allowing the DHCP client to automatically receive an IP address from the DHCP server. Referring to FIG. 13, the client broadcasts a "DHCPDISCOVER" packet to peripheral servers at step S121. If individual servers receive the "DHCPDISCOVER" packet from the client, they answer the received "DHCPDISCOVER" packet and transmit a "DHCPOFFER" packet as a response signal at step S122.

The client receives the "DHCPOFFER" packet from one or more servers at step S122, selects one of the servers to request a configuration parameter, and broadcasts a "DHCPREQUEST" packet at step S123. In this case, servers not selected by the "DHCPREQUEST" packet recognize that the client has declined the offers of the servers.

The server selected by the "DHCPREQUEST" packet includes address configuration information in a "DHCPACK" packet, and transmits the "DHCPACK" packet with the address configuration information to the client as a response signal at step S124. If the client receives the "DHCPACK" packet from the selected server, the client constructs an address. However, if the client receives a "DHCPNAK" packet, the client re-starts the aforementioned process. Furthermore, the client may transmit a "DHCPRELEASE" packet to the server in order to return a leased address at step S125.

FIG. 14 is a flow chart illustrating operations of a mobile IPv6 system. Referring to FIG. 14, if the mobile node (MN) moves from a subnet A to another subnet B at step 0, the mobile node (MN) recognizes that the mobile node (MN) has moved to another subnet B using prefix information of a router advertisement (RA) message and a Neighbor Unreachable Detection (NUD) mechanism at step 1.

The mobile node (MN) alone acquires a temporary address (CoA) using the aforementioned address auto-configuration method at step 2. Thereafter, the mobile node (MN) transmits the "Binding Update (BU)" message, such that the home agent recognizes the acquired CoA at step 3.

The home agent (HA) having received the "BU" message combines (or binds) the home address of the mobile node (MN) with a temporary address (CoA), and transmits a "BACK" message as a response signal to the "BU" message at step 4.

The correspondent node (CN) firstly communicating with the mobile node (MN) does not recognize that the mobile node (MN) has moved to another subnet, such that it sets a destination address to a home address of the mobile node (MN), and transmits a resultant packet to the home agent (HA) at step 5.

The home agent (HA) for managing the mobile node (MN) then intercepts the packet of the correspondent node (CN), and performs tunneling of the packet to a current location of the mobile node (MN) at step 6. If the mobile node (MN) receives the tunneled packet, it determines that the correspondent node (CN) having transmitted the packet does not have the binding information, and transmits the "BU" message to the correspondent node (CN), such that it informs the correspondent node (CN) of a CoA of the mobile node (MN) at step 7.

The correspondent node (CN) having received the CoA of the mobile node (MN) stores the binding information, and directly communicates with the mobile node (MN) using the binding information at step 8.

FIG. 15 is a flow chart illustrating operations of the DHCPv6. Referring to FIG. 15, the client transmits a "SOLICIT" message to the "All_DHCP_Servers" address to recognize location information of a server at step (1). Individual DHCPv6 servers then output an "ADVERTISE" message including prefix information to answer the "SOLICIT" message at step (2).

Thereafter, the client selects one of the DHCPv6 servers, transmits a "REQUEST" message to the selected server, and at the same time requests an additional constituent parameter at step (3). The selected DHCPv6 server then outputs a "REPLY" message to answer the "REQUEST" message at step (4).

The client having received the "REPLY" message transmits a "RENEW" message to the DHCPv6 server, such that it updates conventional constituent parameters and the lifetime of allocated addresses, and starts operation of a T1 timer at step (5). In this case, the reference symbol "T1" is indicative of a specific time during which the client accesses the server having acquired an old address to increase the lifetime of a current address.

The DHCPv6 server then transmits another "REPLY" message as a response signal to the "RENEW" message at step (6). Finally, the client outputs a "RELEASE" message when an allocated address is no longer used, such that a corresponding address is released at step (7).

FIG. 16 is a flow chart illustrating a temporary address (CoA) re-setup procedure when a multi-mode mobile terminal is handed over from one interface network to another interface network. The multi-mode mobile terminal may use the mobile IPv4 system or the mobile IPv6 system to perform mobility management. The mobile IPv4 may use an FA-CoA or a co-located CoA as a temporary address (CoA). The mobile IPv6 may use a state-maintenance-type address or a non-state-maintenance-type address as a temporary address (CoA).

A method for re-establishing a temporary address (CoA) when a multi-mode mobile terminal is handed over to another interface network will hereinafter be described with reference to FIG. 16. First, the mobile terminal establishes a connection state with a link of a current interface network. If a high-quality link is detected from a MAC layer of a new interface network, the mobile terminal transmits the "Link_Avaialble" trigger signal to the MIH function.

The new MAC layer establishes a connection state with a new point of attachment (POA). If the new MAC layer establishes the connection state with the new POA, it performs an authentication process, and informs the MIH function of the mobile terminal and the MIH function of the new POA of the link setup state. The mobile terminal periodically receives an "Agent Advertisement" message of a foreign agent, such that it recognizes that a subnet has been changed to another subnet. The mobile terminal registers a temporary address (FA-CoA) in the home agent (HA).

Provided that a multi-mode mobile terminal is handed over from one subnet to another subnet in a current access interface network, or is handed over to another interface network, such that a subnet address is changed to another address, the mobile terminal must perform an IP temporary address (CoA) re-setup procedure. However, a multi-mode mobile terminal according to the conventional art has been designed to establish the aforementioned IP temporary address (CoA) re-setup procedure using only network layer information. Accordingly, a time delay during which the address is re-established is increased.

SUMMARY OF THE INVENTION

The present invention is directed to establishing a network address of a mobile terminal when the mobile terminal is handed over from one network to another.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for establishing a network address of a mobile terminal in a mobile communication system, the method comprising establishing a unified interface to an upper layer of the mobile terminal for managing messages to and from at least one of a homogeneous network and a heterogeneous network, performing handover of the mobile terminal to at least one of a homogeneous network and a heterogeneous network, receiving in the upper layer a request from the unified interface for establishing a network address of the mobile terminal for the at least one of a homogeneous network and a heterogeneous network for communicating data, and establishing the network address for the at least one of a homogeneous network and a heterogeneous network.

Preferably, the network address is an Internet protocol (IP) address. Preferably, the step of receiving in the upper layer a request occurs when a subnet of the mobile terminal has changed. Preferably, the step of performing handover comprises performing handover from a medium access control layer of a current network to a medium access control layer of the at least one of a homogeneous network and a heterogeneous network. Preferably, the homogeneous network is the current network.

In one aspect of the invention, the method further comprises receiving in a medium access control layer of the mobile terminal an indication from the at least one of a homogeneous network and a heterogeneous network whether to establish the network address of the mobile terminal for the at least one of a homogeneous network and a heterogeneous network for communicating data.

In another aspect of the invention, the method further comprises transmitting an indicator from a medium access control layer of the mobile terminal to the unified interface for indicating whether to establish the network address of the mobile terminal for the at least one of a homogeneous network and a heterogeneous network for communicating data.

Preferably, the unified interface determines whether to establish the network address of the mobile terminal for the at least one of a homogeneous network and a heterogeneous network for communicating data. Preferably, the upper layer comprises at least one of a mobility management protocol and an upper management entity.

In a further aspect of the invention, the method further comprises informing the unified interface from the upper layer that the network address for the at least one of a homogeneous network and a heterogeneous network is established (IP_linksetup_complete).

Preferably, the unified interface is a media independent handover (MIH) function.

In accordance with another embodiment of the present invention, the step of establishing the IP address for the at least one of a homogeneous network and a heterogeneous network comprises soliciting a foreign agent of the at least one of a homogeneous network and a heterogeneous network for the IP address, receiving the IP address from the foreign agent, and registering the IP address for the at least one of a homogeneous network and a heterogeneous network with a home agent of a home network. Preferably, the IP address is a care of address (CoA).

In accordance with another embodiment of the present invention, the step of establishing the IP address for the at least one of a homogeneous network and a heterogeneous network comprises discovering and selecting a dynamic host configuration protocol (DHCP) server of the at least one of a homogeneous network and a heterogeneous network, requesting from the DHCP server the IP address for the at least one of a homogeneous network and a heterogeneous network, receiving the IP address from the DHCP server, and registering the IP address with a home agent of a home network. Preferably, the IP address is a care of address (CoA).

In accordance with another embodiment of the present invention, the step of establishing the IP address for the at least one of a homogeneous network and a heterogeneous network comprises soliciting an access router of the at least one of a homogeneous network and a heterogeneous network for prefix information related to the construction of the IP address for the at least one of a homogeneous network and a heterogeneous network, receiving the prefix information from the access router, constructing the IP address using the received prefix information, and registering the IP address with a home agent of a home network. Preferably, the IP address is a care of address (CoA).

In accordance with another embodiment of the present invention, the step of establishing the IP address for the at least one of a homogeneous network and a heterogeneous network comprises discovering and selecting a dynamic host configuration protocol v6 (DHCP v6) server of the at least one of a homogeneous network and a heterogeneous network, requesting from the DHCP v6 server the IP address for the at least one of a homogeneous network and a heterogeneous network, receiving the IP address from the DHCP v6 server, and registering the IP address with a home agent of a home network. Preferably, the IP address is a care of address (CoA).

In accordance with another embodiment of the present invention, the step of receiving in the upper layer a request from the unified interface for establishing a network address of the mobile terminal occurs prior to performing handover.

In one aspect of the invention, the method further comprises receiving in a medium access control layer of the mobile terminal an indication from a current network whether to establish the network address of the mobile terminal for the at least one of a homogeneous network and a heterogeneous network for communicating data.

In another aspect of the invention, the method further comprises establishing a connection with the at least one of a homogeneous network and a heterogeneous network. Preferably, the step of establishing a connection comprises establishing a connection between a medium access control layer of the mobile terminal and a medium access control layer of the at least one of a homogeneous network and a heterogeneous network.

Preferably, the network address is an Internet protocol (IP) address. Preferably, the step of receiving in the upper layer a request from the unified interface for establishing a network address of the mobile terminal occurs when a subnet of the mobile terminal has changed. Preferably, the step of performing handover comprises performing handover from a medium access control layer of a current network to a medium access control layer of the at least one of a homogeneous network and a heterogeneous network In a further aspect of the invention, the method further comprises transmitting an indicator from a medium access control layer of the mobile terminal to the unified interface for indicating whether to establish the network address of the mobile terminal for the at least one of a homogeneous network and a heterogeneous network for communicating data.

Preferably, the unified interface determines whether to establish the network address of the mobile terminal for the at least one of a homogeneous network and a heterogeneous network for communicating data. Preferably, the upper layer comprises at least one of a mobility management protocol and an upper management entity.

In another aspect of the invention, the method further comprises informing the unified interface from the upper layer that the network address for the at least one of a homogeneous network and a heterogeneous network is established.

Preferably, the unified interface is a media independent handover (MIH) function.

In one aspect of the invention, the step of establishing the IP address for the at least one of a homogeneous network and a heterogeneous network comprises soliciting a foreign agent of the at least one of a homogeneous network and a heterogeneous network for the IP address, receiving the IP address from the foreign agent, and registering the IP address for the at least one of a homogeneous network and a heterogeneous network with a home agent of a home network. Preferably, the IP address is a care of address (CoA).

In another aspect of the invention, the step of establishing the IP address for the at least one of a homogeneous network and a heterogeneous network comprises discovering and selecting a dynamic host configuration protocol (DHCP) server of the at least one of a homogeneous network and a heterogeneous network, requesting from the DHCP server the IP address for the at least one of a homogeneous network and a heterogeneous network, receiving the IP address from the DHCP server, and registering the IP address with a home agent of a home network. Preferably, the IP address is a care of address (CoA).

In a further aspect of the invention, the step of establishing the IP address for the at least one of a homogeneous network and a heterogeneous network comprises soliciting an access router of the at least one of a homogeneous network and a heterogeneous network for prefix information related to the construction of the IP address for the at least one of a homogeneous network and a heterogeneous network, receiving the prefix information from the access router, constructing the IP address using the received prefix information, and registering the IP address with a home agent of a home network. Preferably, the IP address is a care of address (CoA).

In yet another aspect of the invention, the step of establishing the IP address for the at least one of a homogeneous network and a heterogeneous network comprises discovering and selecting a dynamic host configuration protocol v6 (DHCP v6) server of the at least one of a homogeneous network and a heterogeneous network, requesting from the DHCP v6 server the IP address for the at least one of a homogeneous network and a heterogeneous network, receiving the IP address from the DHCP v6 server, and registering the IP address with a home agent of a home network. Preferably, the IP address is a care of address (CoA).

In accordance with another embodiment of the present invention a mobile terminal capable of establishing a network address in a mobile communication system comprises a unified interface for managing messages to and from an upper layer of the mobile terminal and at least one of a homogeneous network and a heterogeneous network, means for performing handover of the mobile terminal to at least one of a homogeneous network and a heterogeneous network, means for receiving in the upper layer a request from the unified interface for establishing a network address of the mobile terminal for the at least one of a homogeneous network and a heterogeneous network for communicating data, and means for establishing the network address for the at least one of a homogeneous network and a heterogeneous network.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 27 also illustrates a method for performing an IP address re-setup procedure after the mobile terminal is handed over to another interface network in accordance with one embodiment of the present invention.

DETAILED DESCRIPTION OF THE PREFERRED EMBODIMENTS

Figure 1:
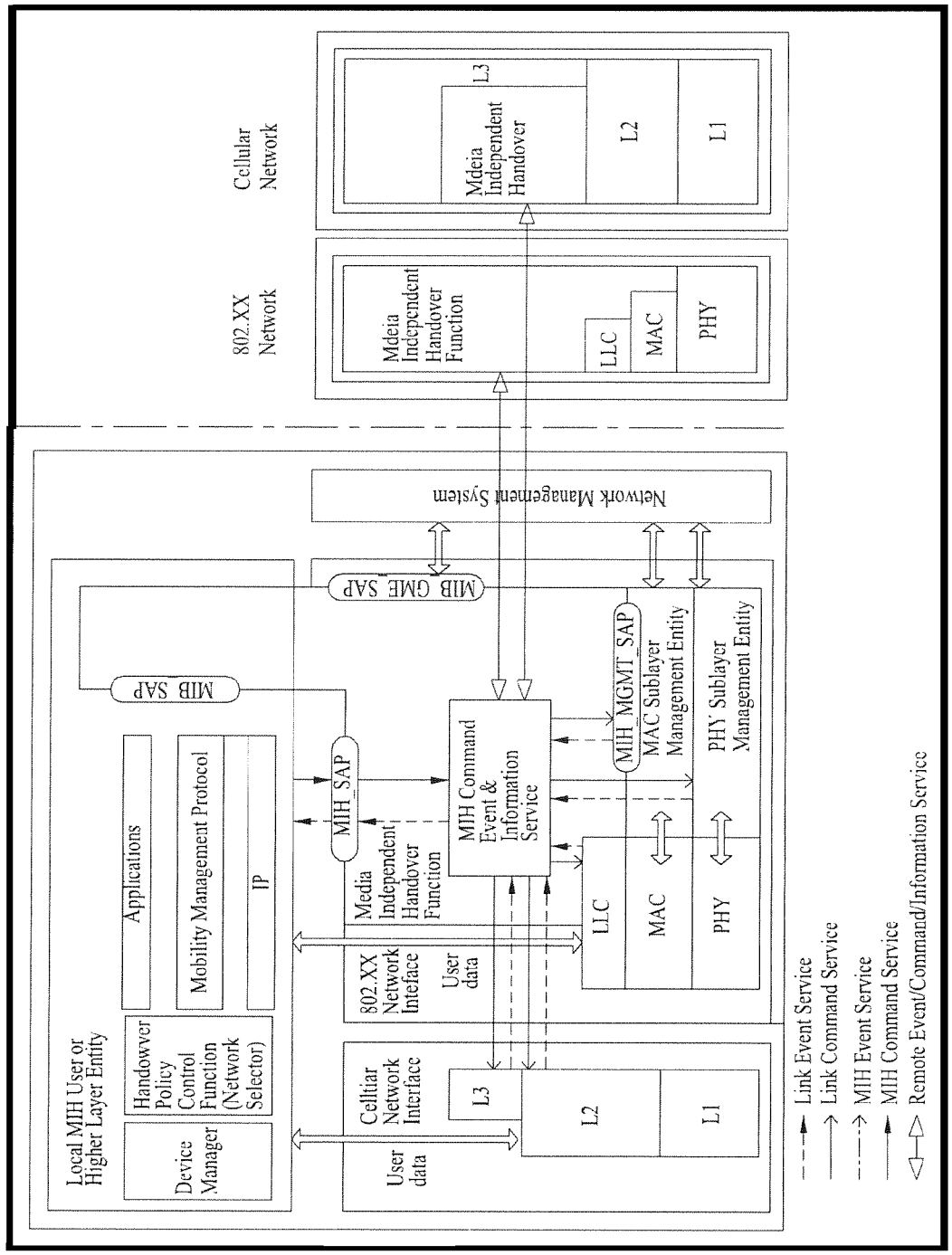
FIG. 1 illustrates a general media independent handover function (MIHF) reference model.
Figure 2:
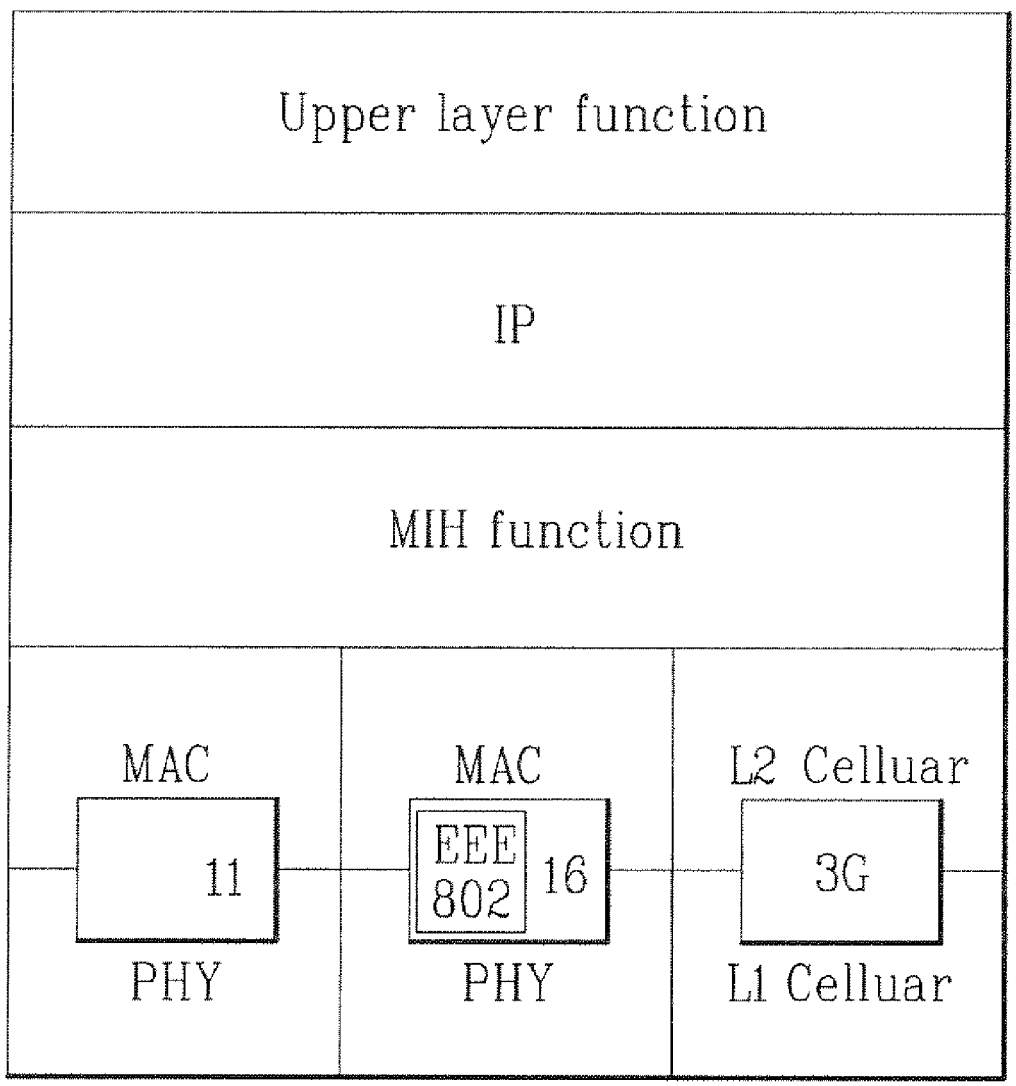
FIG. 2 is a structural diagram illustrating a multi-mode mobile terminal.
Figure 3:
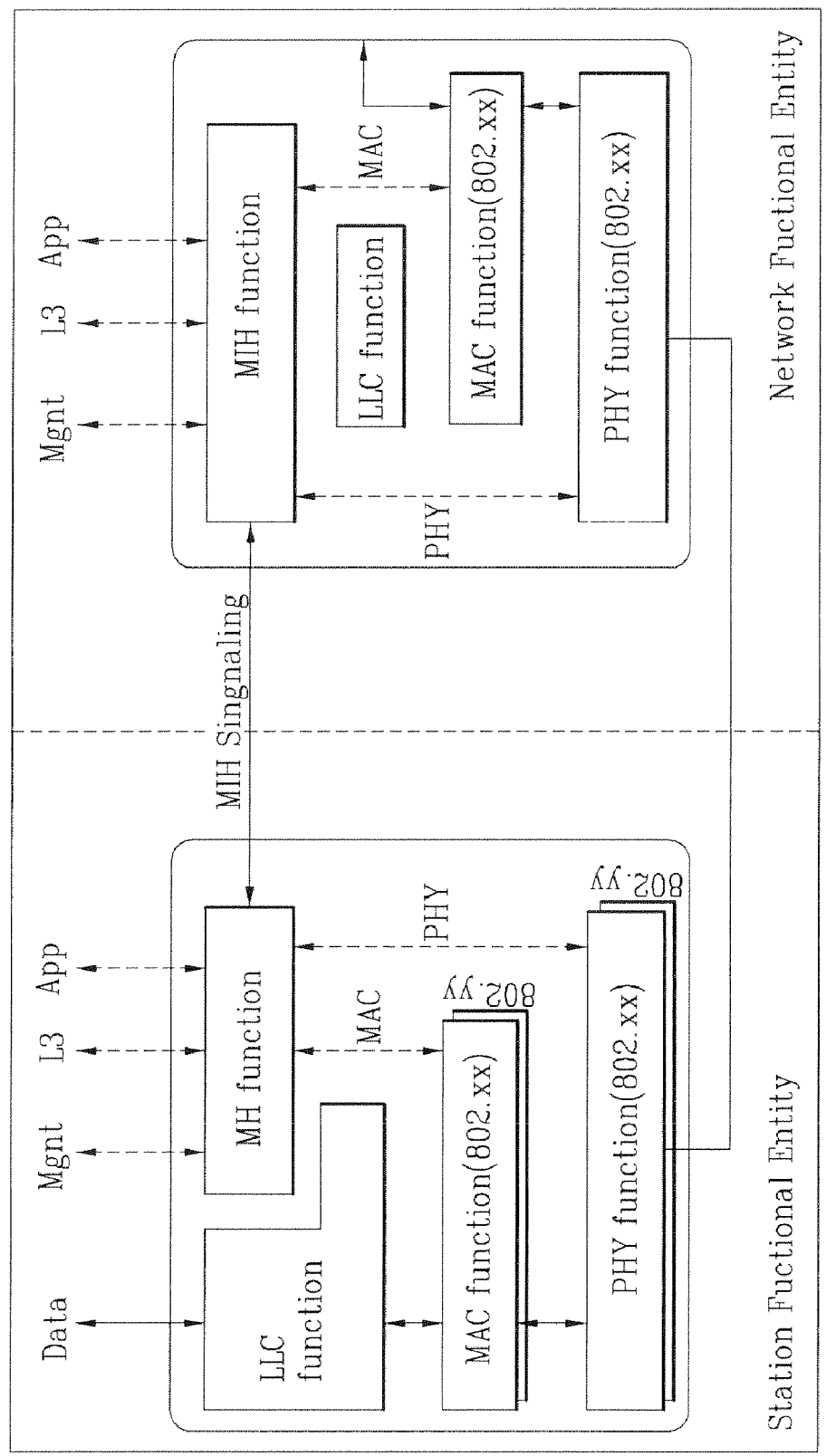
FIG. 3 is a block diagram illustrating a media independent handover (MIH) structure and a transmission protocol.
Figure 4:
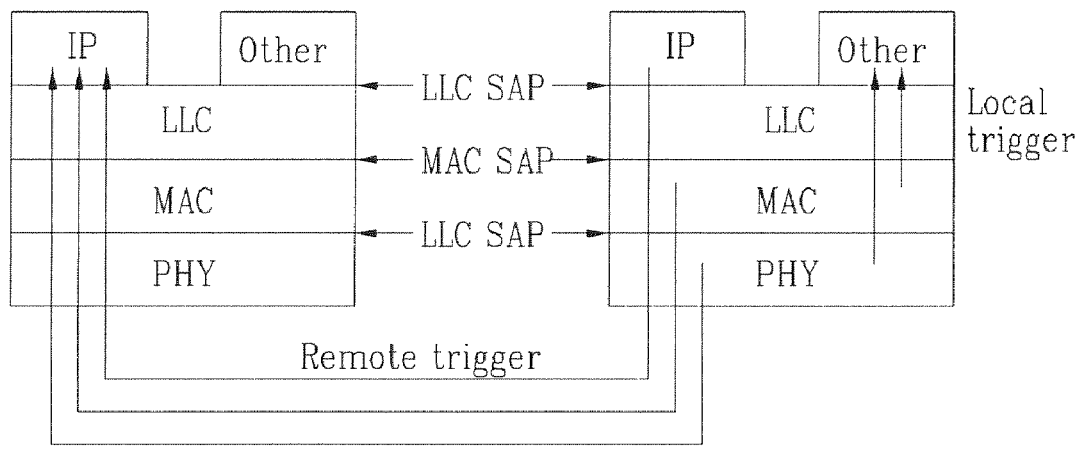
FIG. 4 is a structural diagram illustrating an event trigger.
Figure 5:
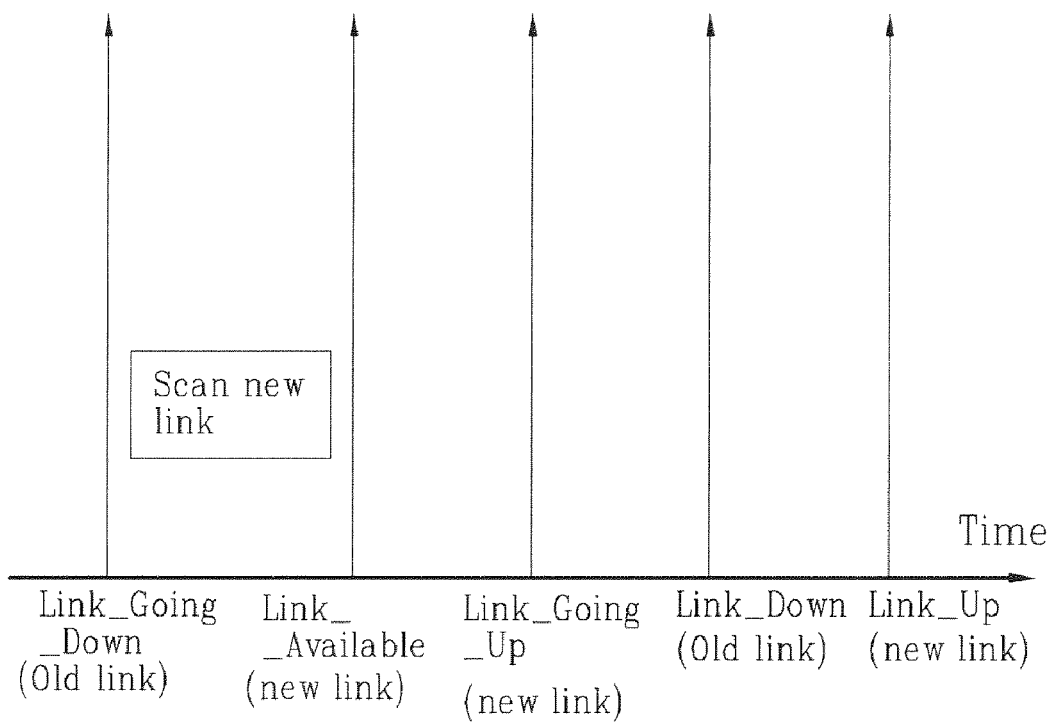
FIG. 5 illustrates triggers generated until a link setup process from a current access link to a new link is performed.
Figure 6:
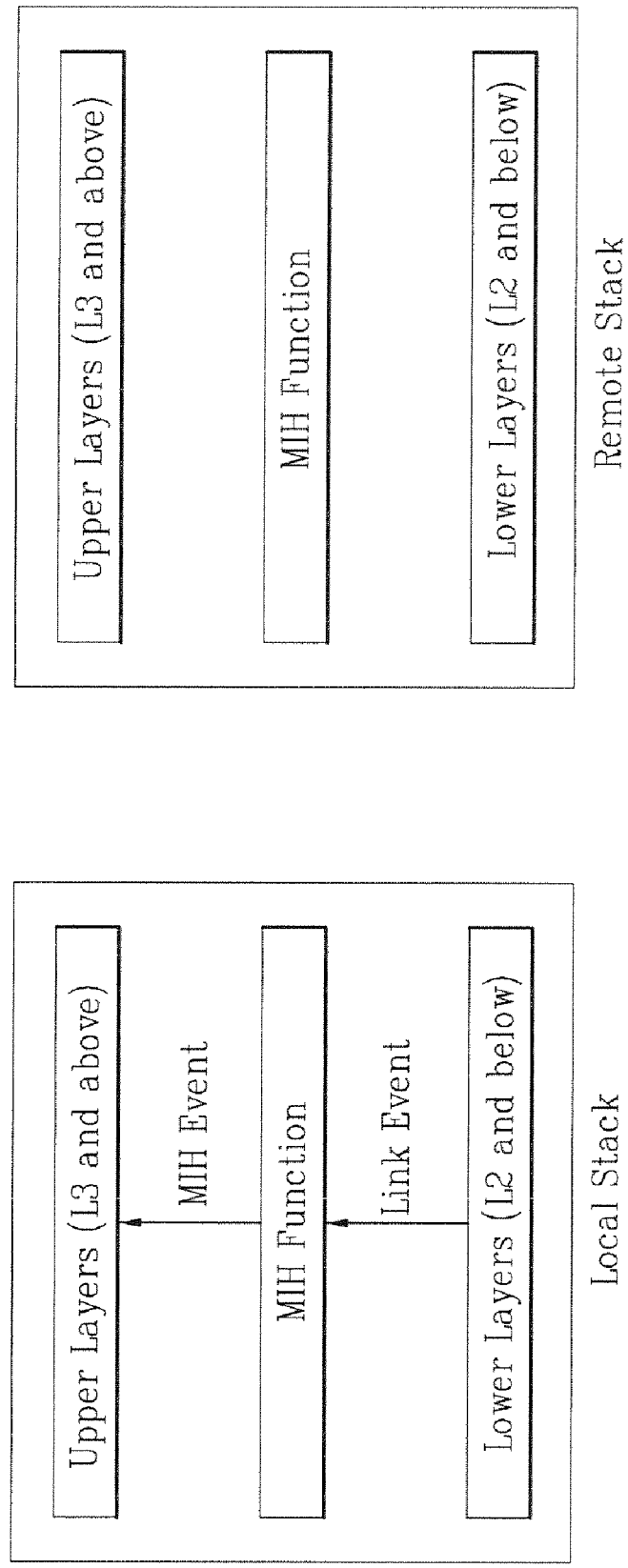
FIG. 6 is a structural diagram illustrating a "Link Event" model and an "MIH Event" model.
Figure 7:
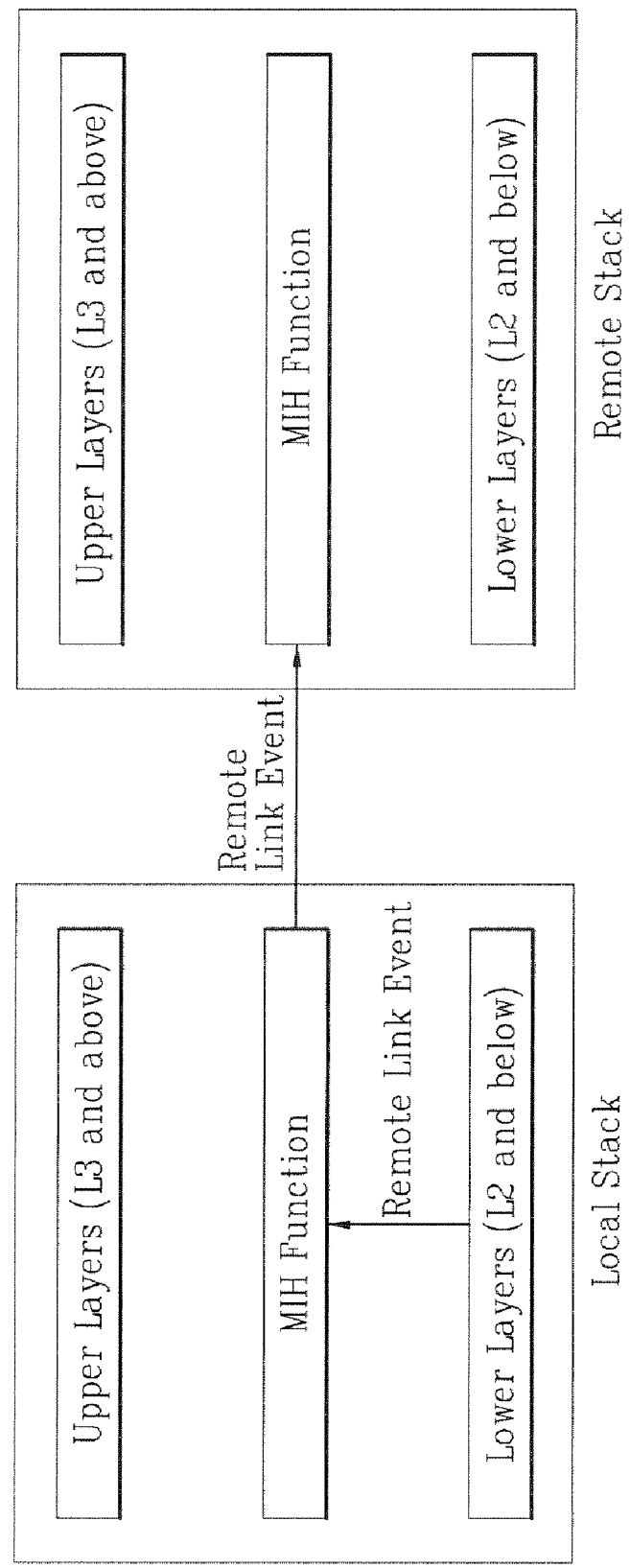
FIG. 7 is a structural diagram illustrating a "Remote Link Event" model.
Figure 8:
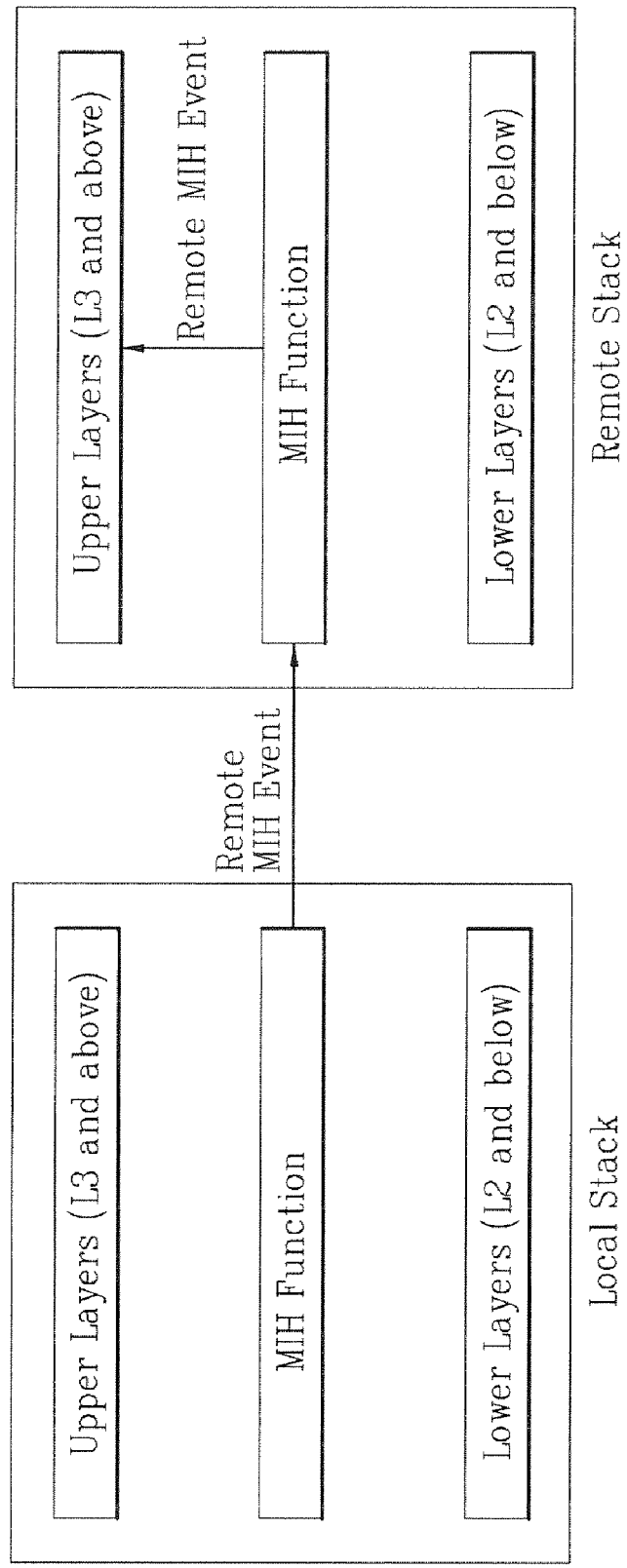
FIG. 8 is a structural diagram illustrating a "Remote MIH Event" model.
Figure 9:
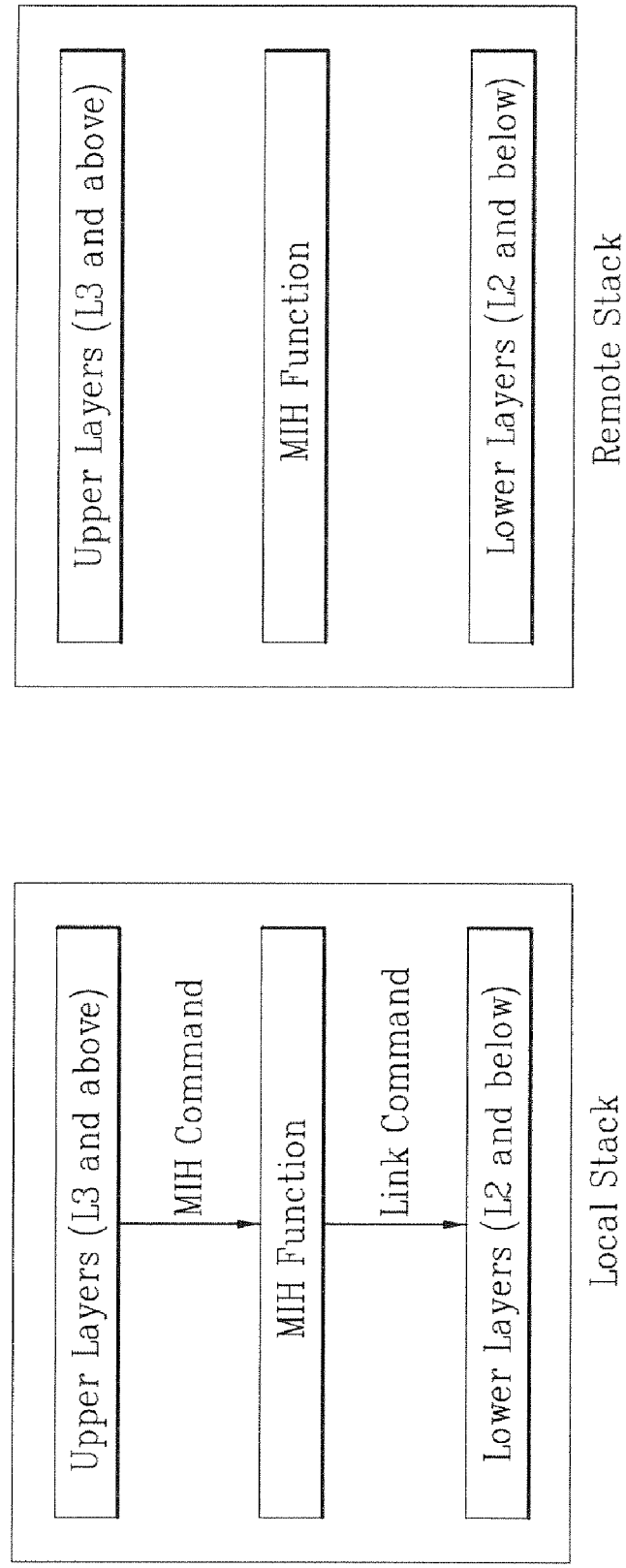
FIG. 9 is a structural diagram illustrating an "MIH command" model and a "Link command" model.
Figure 10:
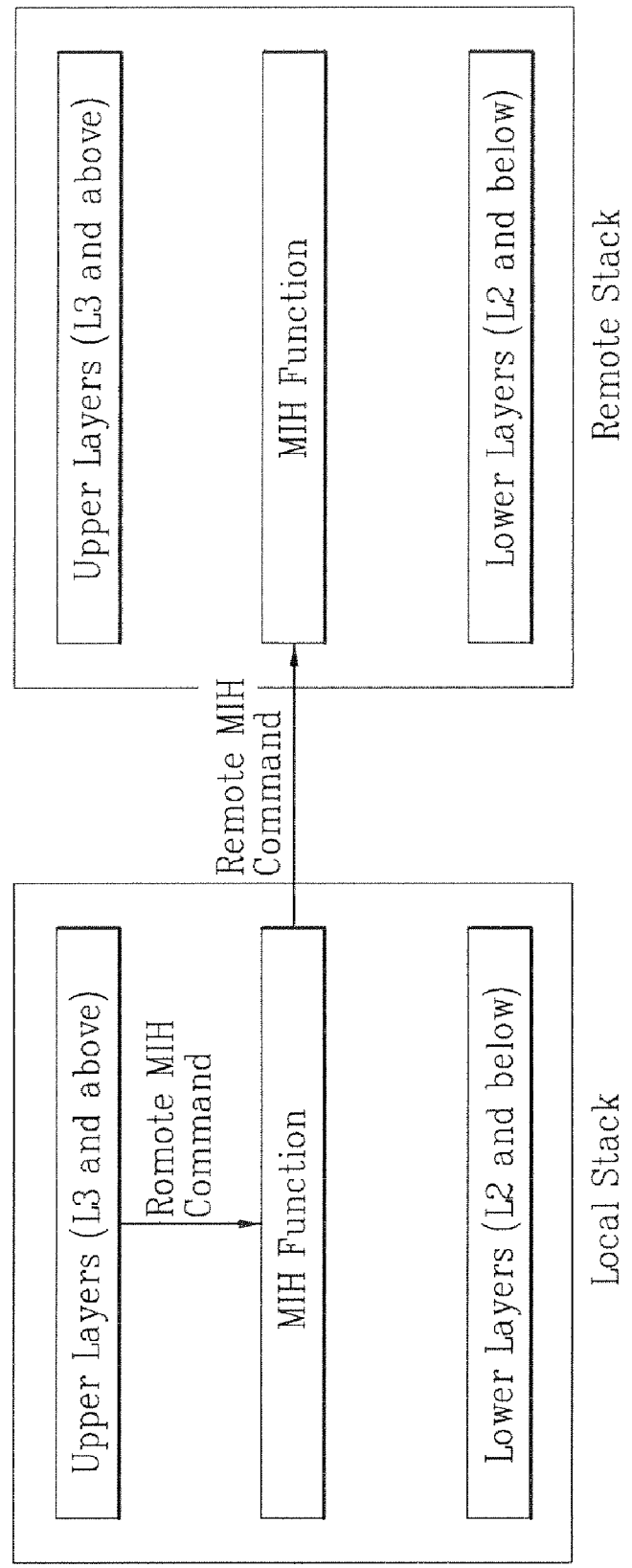
FIG. 10 is a structural diagram illustrating a "Remote MIH command" model.
Figure 11:
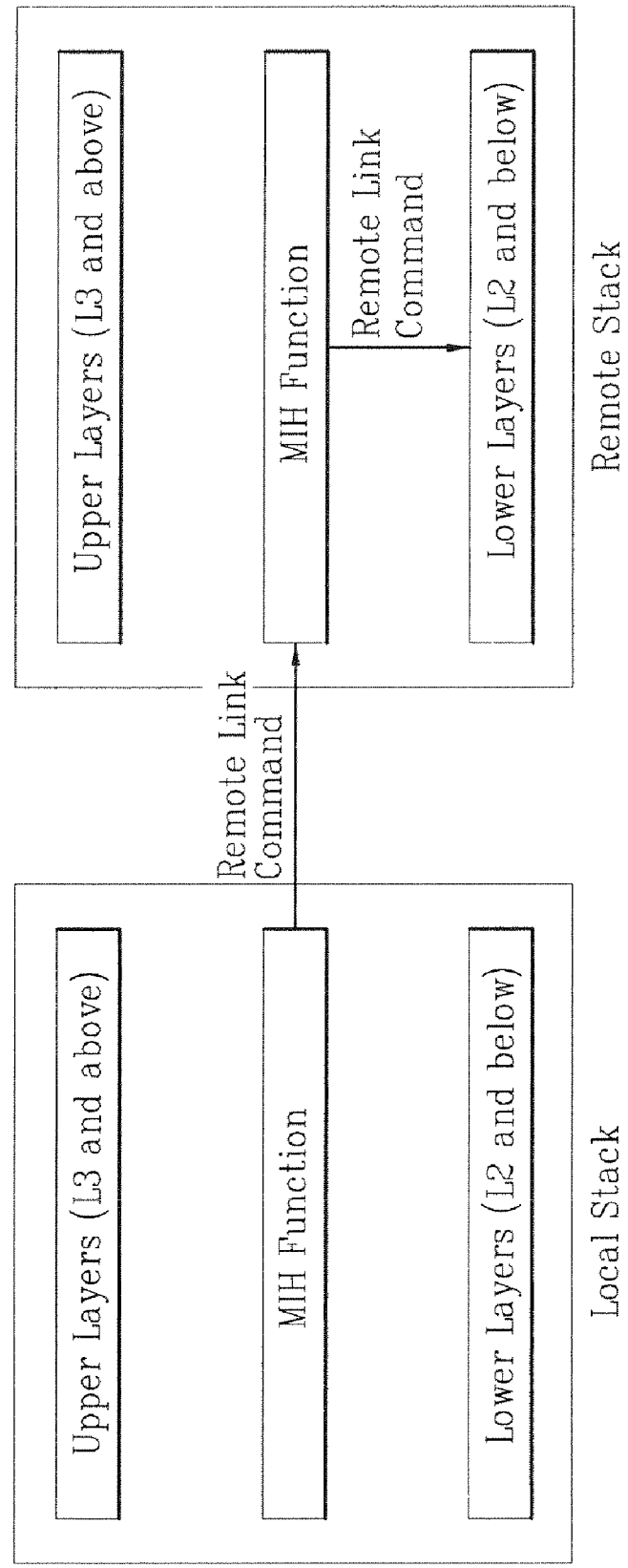
FIG. 11 is a structural diagram illustrating a "Remote Link Command" model.
Figure 12:
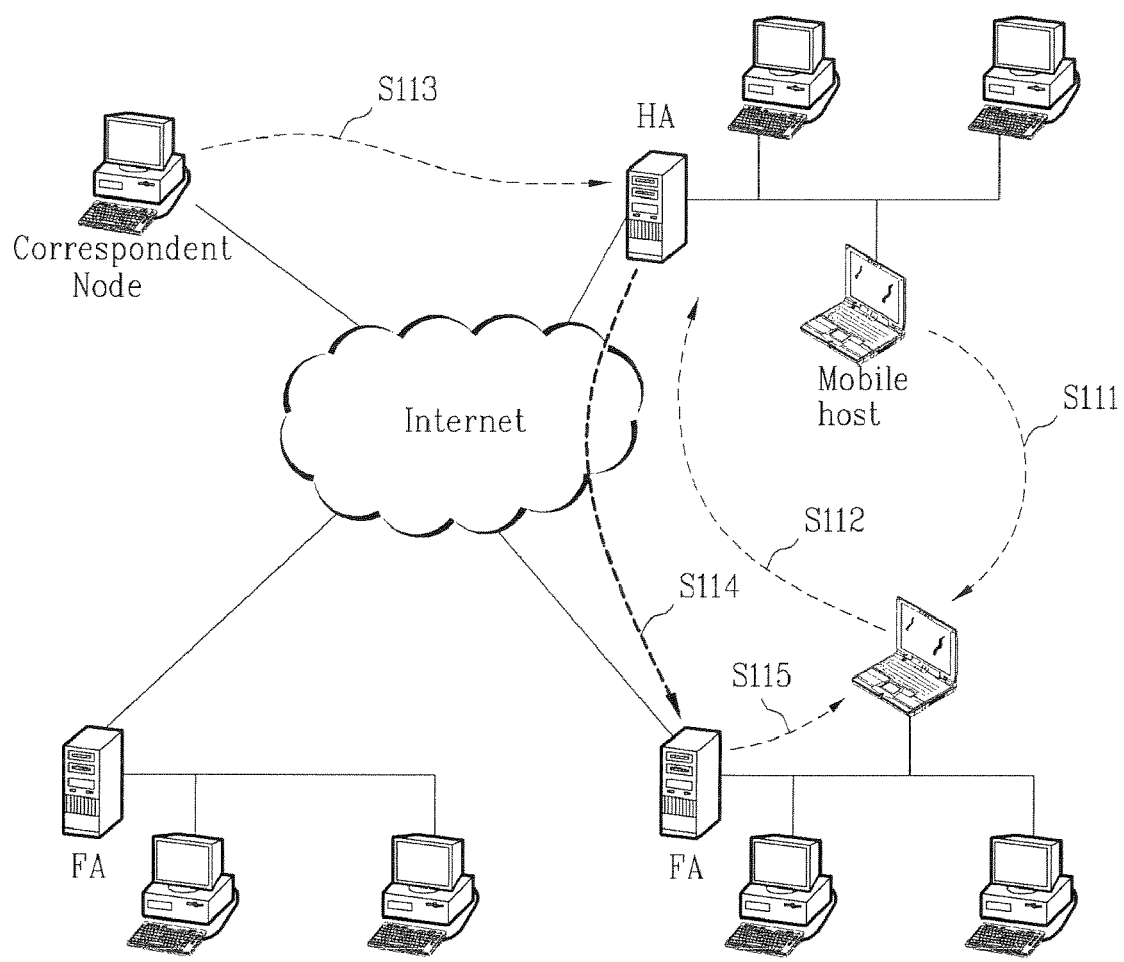
FIG. 12 is a diagram illustrating operations of a mobile IPv4 system.
Figure 13:
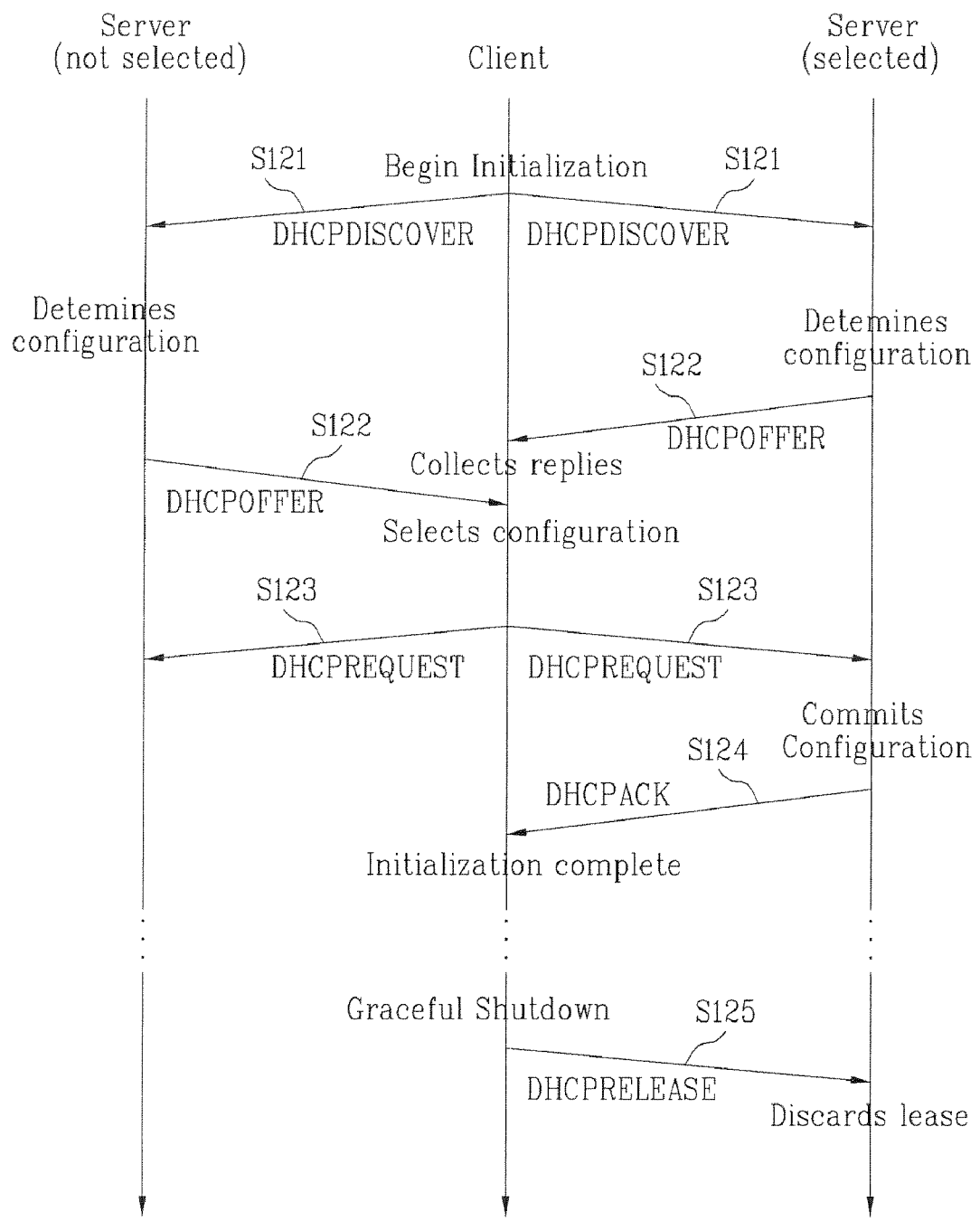
FIG. 13 is a flow chart illustrating a method for allowing a dynamic host configuration protocol (DHCP) client to automatically receive an Internet protocol (IP) address from a DHCP server.
Figure 14:
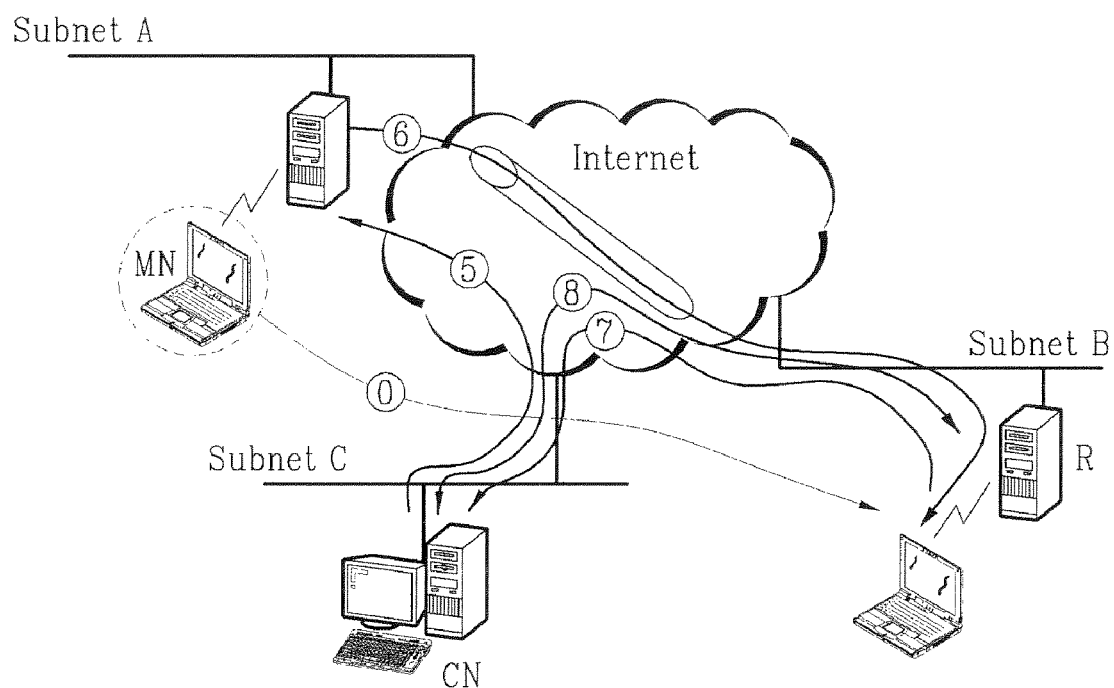
FIG. 14 is a flow chart illustrating operations of a Mobile IPv6 system.
Figure 15:
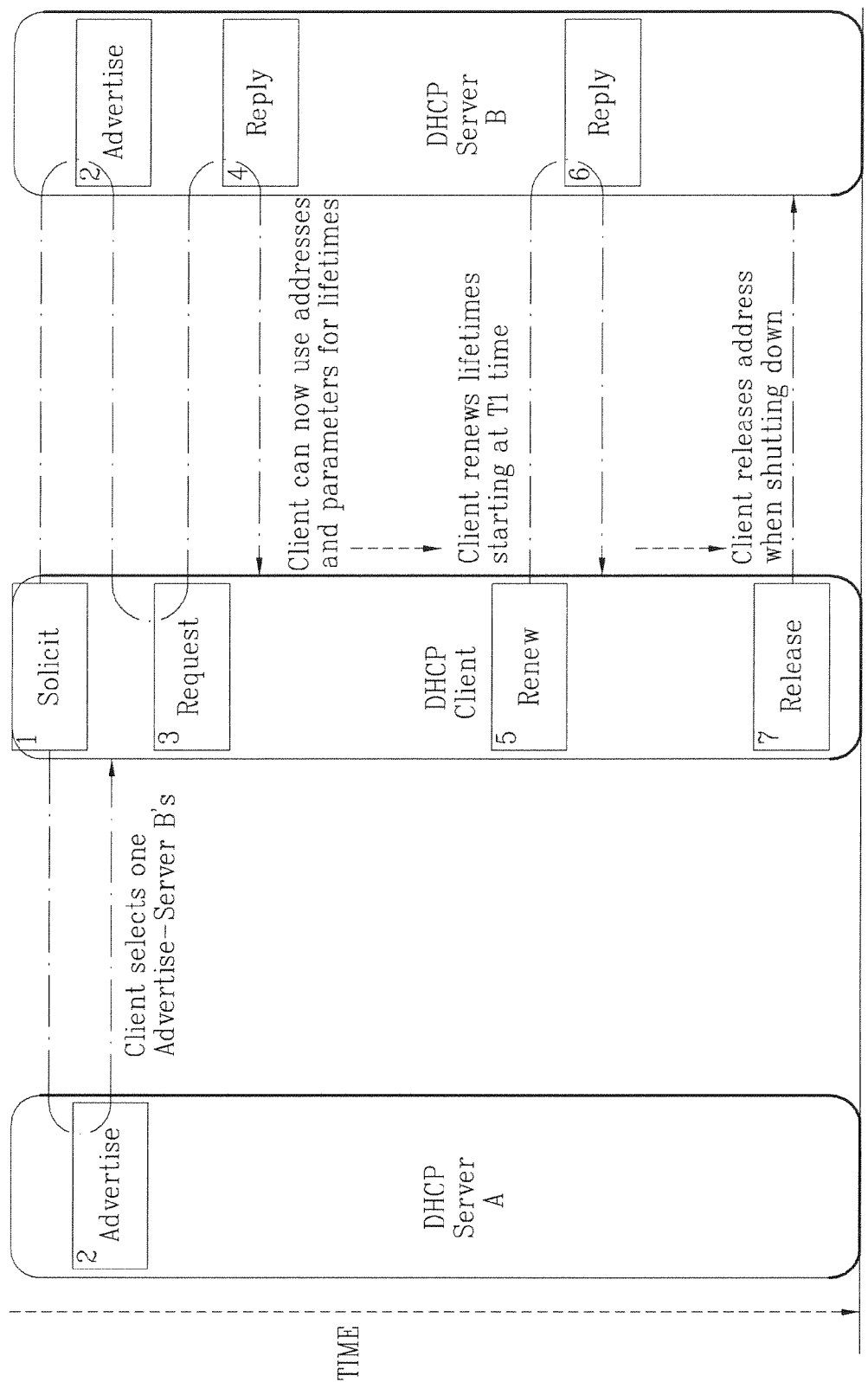
FIG. 15 is a flow chart illustrating operations of DHCPv6 serever.
Figure 16:
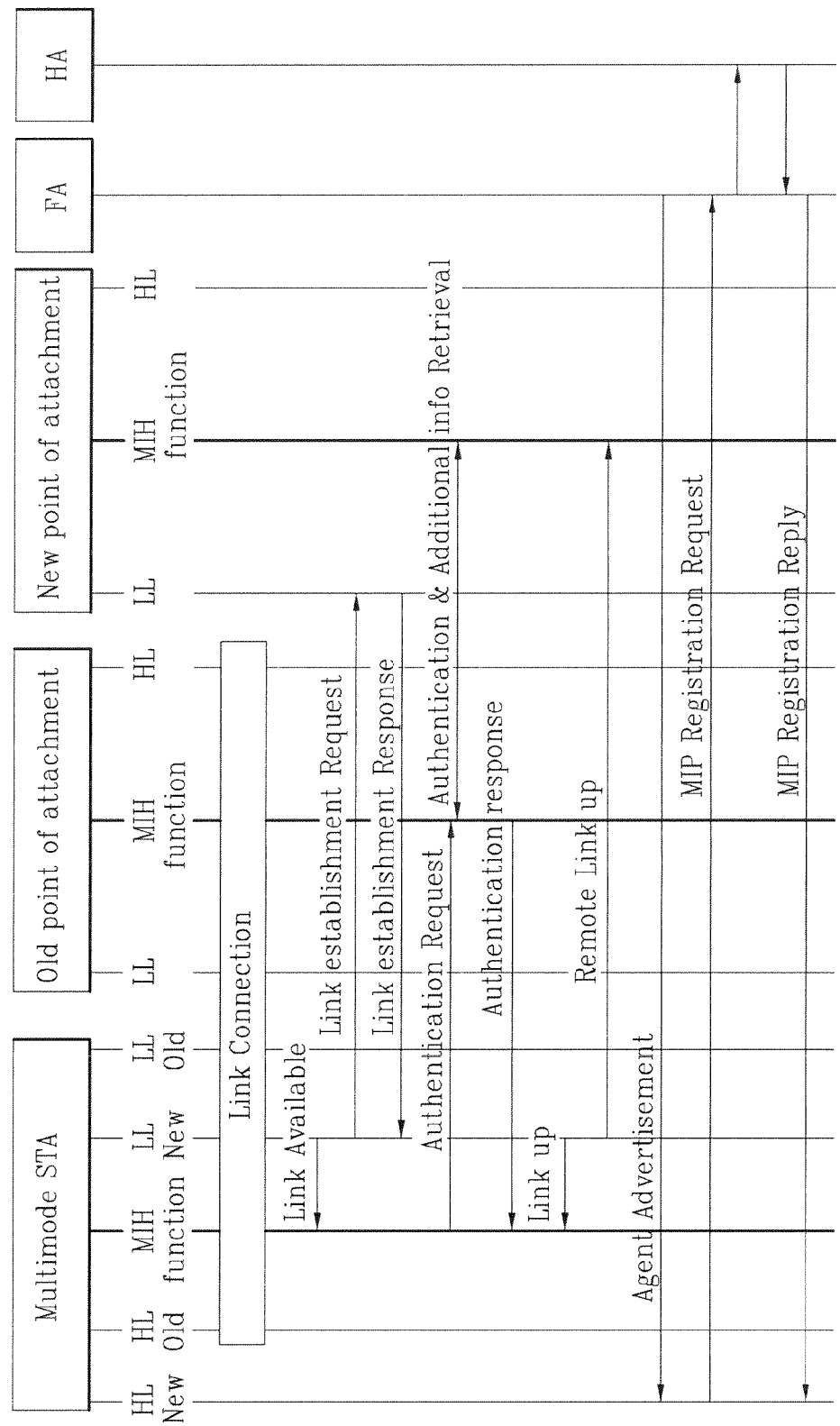
FIG. 16 is a flow chart illustrating a temporary address or care of address (CoA) re-setup procedure when a multi-mode mobile terminal is handed over from one interface network to another interface network.

The present invention relates to establishing a network address of a mobile terminal in a mobile communication system when the mobile terminal is handed over from one network to another.

Reference will now be made in detail to the preferred embodiments of the present invention, examples of which are illustrated in the accompanying drawings. Wherever possible, the same reference numbers will be used throughout the drawings to refer to the same or like parts.

The present invention will hereinafter be disclosed with reference to standard specification IEEE 802.21. An event service and a command service associated with an inventive IP address re-setup procedure will now be described.

A new point of attachment (POA), such as a base station, of a mobile terminal receives a "Link_Up" trigger signal, and triggers an "IP_Renewal_Indication" event to inform the mobile terminal of a changed or unchanged state of an IP address used for transmitting IP packets to the mobile terminal. Preferably, the IP address is set to a newly-assigned IP address in the case of a DHCP system. Alternatively, the IP address is set to a new temporary address (CoA) in the case of a mobile IPv4 system. Moreover, the IP address is set to an Autoconfiguration address in the case of a mobile IPv6 system. A source of the "IP_Renewal_Indication" event corresponds to a "Remote MAC" and an "MIH".

An old POA (e.g., a base station) of the mobile terminal communicates with the new POA at which the mobile terminal arrives, acquires information associated with an IP address of the mobile terminal, triggers the "IP_Renewal_Indication" event to inform the mobile terminal of a changed or unchanged state of an IP address used for transmitting IP packets to the mobile terminal, and the triggered event to the mobile terminal. Preferably, the IP address is set to a newly-assigned IP address in the case of a DHCP system, set to a new temporary address (CoA) in the case of a mobile IPv4 system, and set to an Autoconfiguration address in the case of a mobile IPv6 system.

The following Table 10 shows parameters of the "IP_Renewal_Indication" event.

TABLE 10

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| IP_Renewal_Indicator | | Presence or absence of IP temporary address change necessity 0: No change required 1: Change required |
| MacMobileTerminal | MAC Address | MAC address of Mobile Terminal |
| Network ID | IP Address | Network address to which mobile terminal is connected in old link |

Upon receiving the "IP_Renewal_Indication" trigger signal indicative of an address re-establishment state, the MIH function of the mobile terminal transmits an "IP_Renewal_Request MIH" event to an upper management entity including a mobility management entity, such that it commands the upper management entity to re-establish an IP temporary address (CoA). If the MIH function transmits the "IP_Renewal_Indication" event to the upper management entity, the "IP_Renewal_Indication" event has the same message format as that of the "IP_Renewal_Request MIH" event. A source of the "IP_Renewal_Indication" event corresponds to a "Local MAC" layer and an "MIH".

The following Table 11 shows parameters of the "IP_Renewal_Request" event.

TABLE 11

| Name | Type | Description |
| --- | --- | --- |
| EventSource | EVENT_LAYER_TYPE | Source at which event occurs |
| EventDestination | EVENT_LAYER_TYPE | Destination to which event is to be transmitted |
| Network ID | IP Address | Network address to which mobile terminal is connected in old link |

If the upper management entity receives the "IP_Renewal_Request" event from the MIH function, it transmits an "IP_Linksetup_Complete" event to the MIH function after completing an IP CoA re-setup procedure. A source of the "IP_Linksetup_Complete" event corresponds to a remote MAC layer. The following Table 12 shows parameters of the "IP_LinkSetup_Complete" event.

TABLE 12

| Name | Type | Description |
| --- | --- | --- |
| CommandSource | COMMAND_LAYER_TYPE | Source at which event occurs |
| CommandDestination | COMMAND_LAYER_TYPE | Destination to which event is to be transmitted |
| Old Network ID | IP Address | Network address to which mobile terminal is connected in old link |
| Network ID | IP Address | Network address to which mobile terminal is connected in new link |

The relationship among the event/command services associated with the IP address re-setup procedure, and the stack of the multi-mode mobile terminal will hereinafter be described.

Figure 17:
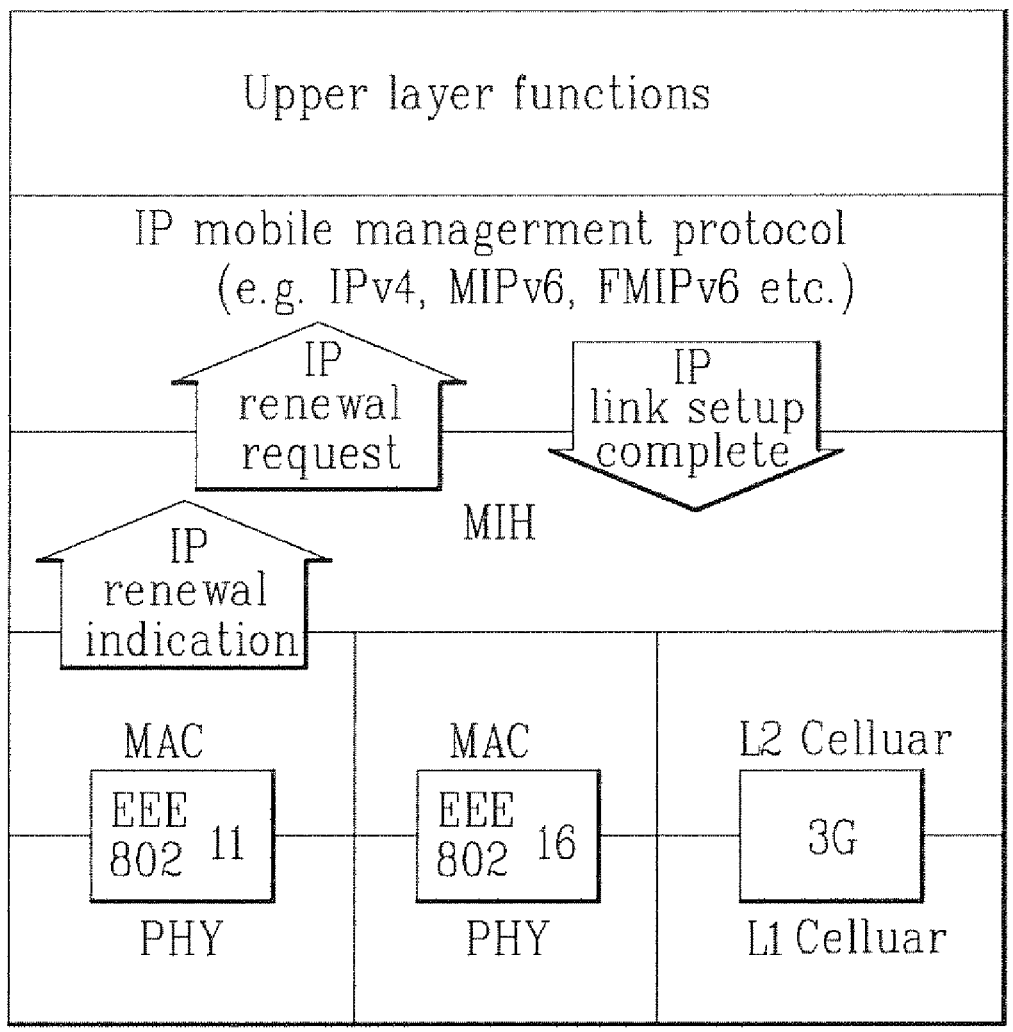
FIG. 17 is a diagram illustrating a protocol stack of a multi-mode mobile terminal and IP address setup trigger operations in accordance with one embodiment of the present invention.

FIG. 17 is a diagram illustrating a protocol stack of the multi-mode mobile terminal and IP address setup trigger operations, in accordance with one embodiment of the present invention.

If a new network to which the multi-mode mobile terminal is handed over cannot use an IP address of an old network, the "IP_Renewal_Indication" event is transmitted to the MIH function according to one of a plurality of methods depending on the network type. In accordance with a first method, the MAC layer message (i.e., L2 message) may indicate that the new network can use an address used by the old network. In accordance with a second method, the MAC layer message may indicate that the new network cannot use the address used by the old network.

In the case of the first method, the MAC layer message indicative of the IP address re-setup state is transmitted to a second layer (L2), such that the message is generated from the MAC layer.

In the case of the second method, the second layer (L2) cannot determine whether the IP address re-setup is required due to the handover of the multi-mode mobile terminal. Accordingly, the MIH function contained in the network (i.e., a POA or base station to be connected) transmits specific information indicative of the above situation to the MIH function of the mobile terminal. In this case, the L2 layer clearly transmits the message to the MIH function.

The aforementioned first method may be performed in association with a Bit #3 of HO Process Optimization TLV of standard specification IEEE 802.16. Although the handover occurs in other networks, the first method may also be implemented by an indicator similar to the Bit #3.

If a new IP-layer address is established, the "IP_Link-Setup_Complete" event is indicative of a trigger signal, which informs the MIH function of the new IP-layer address setup, and commands the MIH function to conduct necessary operations. For example, in the case of a "Make Before Break" handover, the release of MAC/PHY layers capable of maintaining a connection (or link) state with the old network is conducted at a specific time at which a connection (or link) state to a current network is completely established. The IP mobile protocol then completes the IP address setup process, such that the "IP_linkSetup_Complete" event may be adapted to indicate the above specific time.

Operations of the inventive method will be classified into operations of a first case in which FA-CoA or co-located CoA of the mobile IPv4 system is used as a temporary address (CoA). A second case comprises operations in which a state-maintenance-type address or non-state-maintenance-type address of the mobile IPv6 system is used as a temporary address (CoA).

A method for employing the FA-CoA of the mobile IPv4 system as a CoA when a mobile terminal is handed over to another interface network will hereinafter be described.

Figure 18:
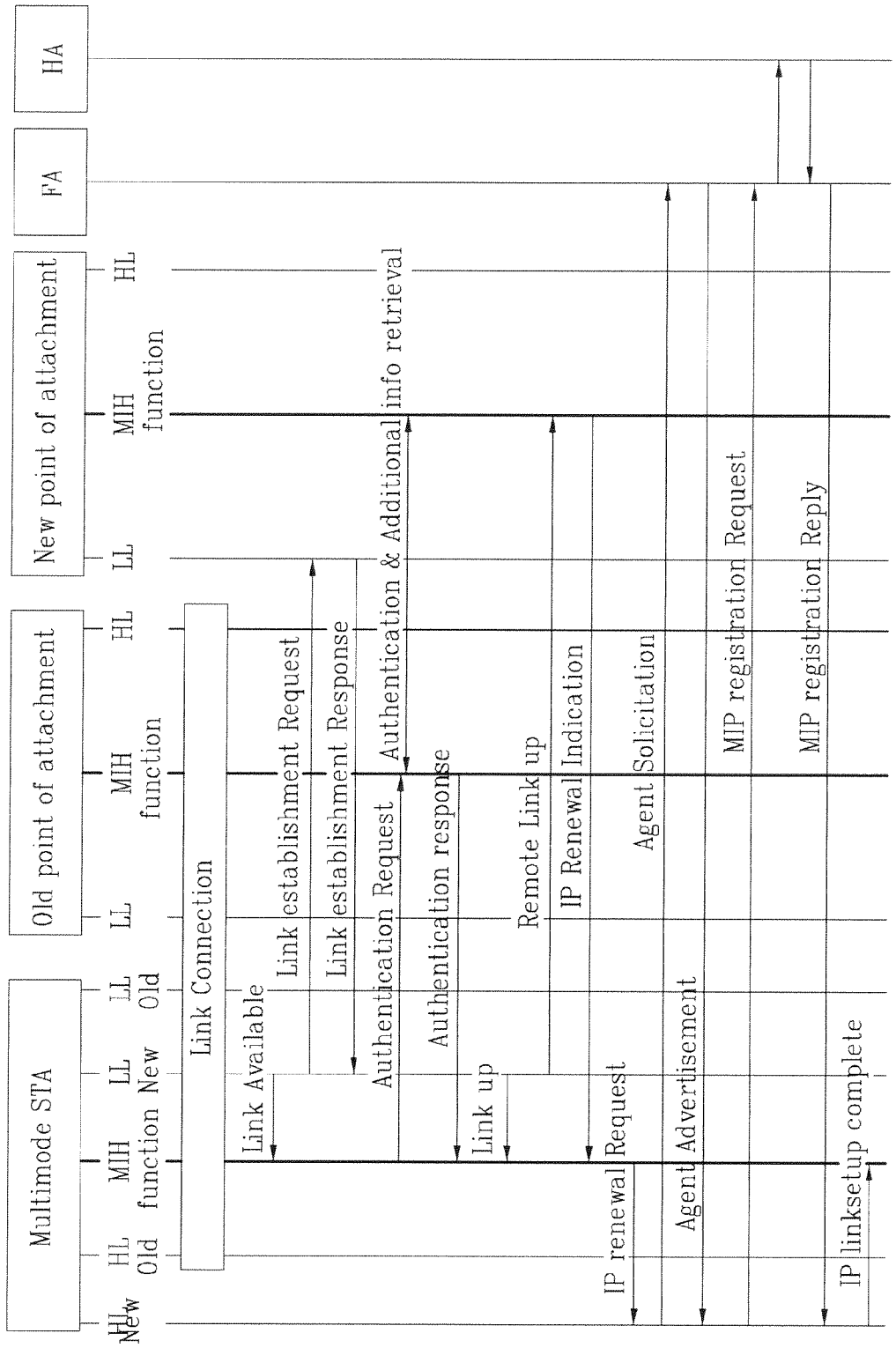
FIG. 18 is a flow chart illustrating a method for re-establishing an IP address using an "FA-CoA" of the mobile IPv4 system as a temporary address or care of address (CoA) when a mobile terminal is handed over to another interface network such that a subnet is changed, in accordance with one embodiment of the present invention.

FIG. 18 is a flow chart illustrating a method for re-establishing an IP address using an "FA-CoA" of the mobile IPv4 system as a temporary address (CoA) when the mobile terminal is handed over to another interface network such that a subnet is changed, in accordance with one embodiment of the present invention.

Referring to FIG. 18, the mobile terminal establishes a connection state with a link of a current interface network. If a high-quality link is detected from a lower layer (LL), such as a MAC layer of a new interface network, the mobile terminal transmits a "Link_Available" trigger signal to an MIH function of the mobile terminal. The new MAC layer (LL New) then establishes a connection state with a new point of attachment (POA). If the new MAC layer establishes the connection state with the new POA, the new MAC layer performs an authentication process, and informs the MIH function of the mobile terminal and an MIH function of the new POA of the link setup state.

The MIH function of the new POA transmits an "IP_Renewal_Indication" event for commanding a CoA re-setup process to the MIH function of the mobile terminal when a subnet of the mobile terminal is changed to another subnet. If the "IP_Renewal_Indication" event commands the CoA re-setup process, the MIH function of the mobile terminal transmits an "IP_Renewal_Request" trigger signal to a higher layer (HL) of the mobile terminal, such as a network layer, such that it commands the network layer to re-establish a CoA.

If the network layer of the mobile terminal receives the "IP_Renewal_Request" trigger signal, the network layer transmits an "Agent Solicitation" message to a foreign agent (FA) to acquire a new temporary address (CoA). The foreign agent (FA) transmits an "Agent_Advertisement" message to the mobile terminal to answer the "Agent Solicitation" message. The network layer of the mobile terminal then registers a temporary address (CoA) with a home agent (HA) upon receiving the "Agent_Advertisement" message. If the CoA re-setup process is completed, the network layer of the mobile terminal transmits an "IP_Linksetup_Complete" trigger message to the MIH function of the mobile terminal.

A method for employing a "co-located CoA" of the mobile IPv4 system as a CoA when a mobile terminal is handed over to another interface network will hereinafter be described.

Figure 19:
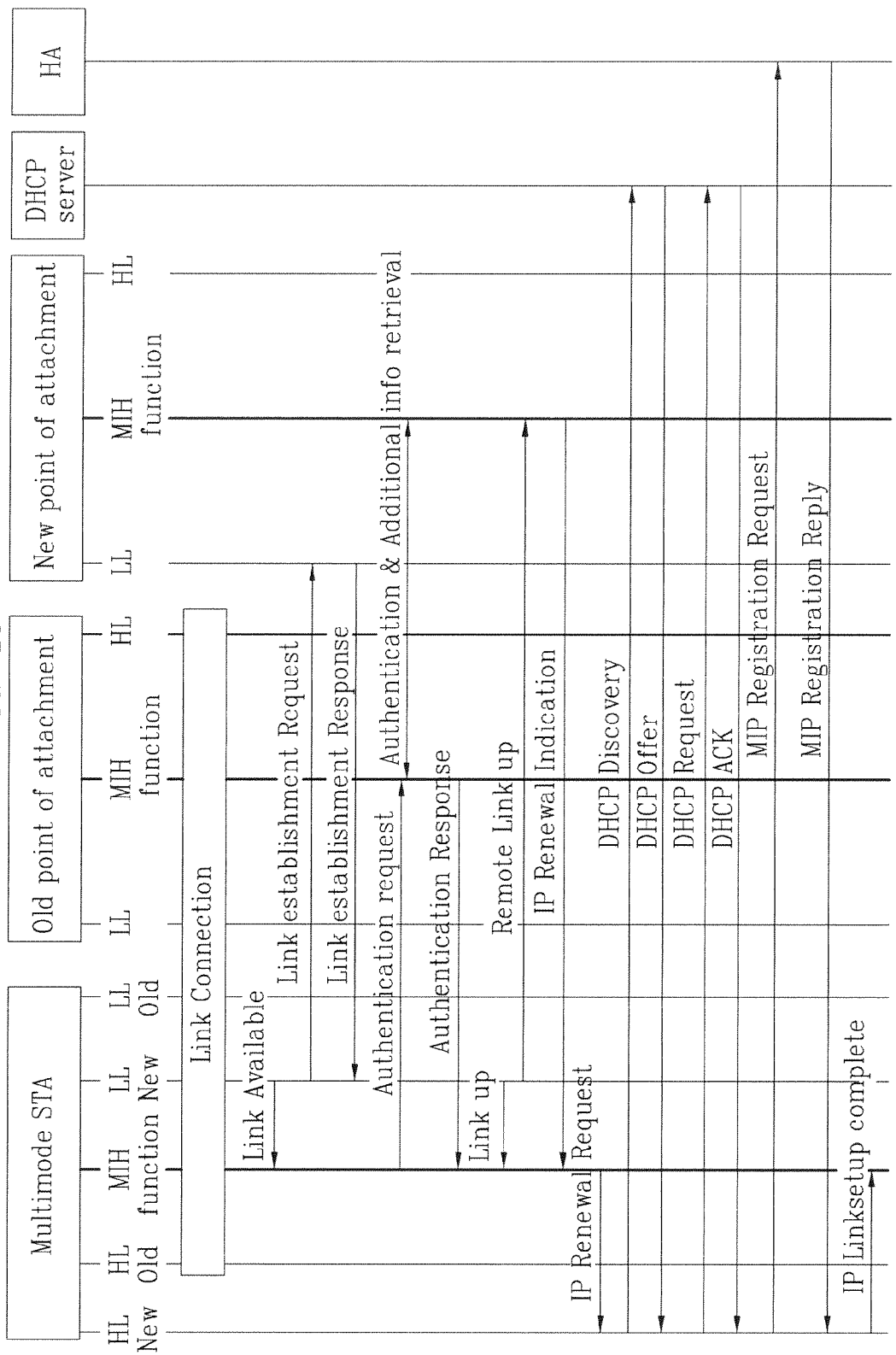
FIG. 19 is a flow chart illustrating a method for re-establishing an address using a "co-located CoA" of the mobile IPv4 system as a temporary address or care of address (CoA) when a mobile terminal is handed over to another interface network such that a subnet is changed, in accordance with one embodiment of the present invention.

FIG. 19 is a flow chart illustrating a method for re-establishing an address using a "co-located CoA" of the mobile IPv4 system as a temporary address (CoA) when a mobile terminal is handed over to another interface network such that a subnet is changed, in accordance with one embodiment of the present invention.

Referring to FIG. 19, if the mobile terminal re-establishes an IP temporary address (CoA) using the "co-located CoA", and receives the "IP_Renewal_Indication" trigger signal indicative of a CoA re-setup state from the MIH function of a new point of attachment (POA), the MIH function of the mobile terminal transmits the "IP_Renewal_Request" trigger signal to the network layer. Upon receiving the "IP_Renewal_Request" trigger signal, the network layer of the mobile terminal transmits a "DHCP Discovery" message to receive a temporary address (CoA). If the network layer of the mobile terminal receives the temporary address (CoA), the mobile terminal registers the received CoA with the home agent (HA). If the CoA registers with the home agent (HA), the network layer of the mobile terminal transmits the "IP_Linksetup_Complete" trigger signal to the MIH function.

A method for employing a "non-state-maintenance-type address" of the mobile IPv6 system as a CoA when a mobile terminal is handed over to another interface network will hereinafter be described.

Figure 20:
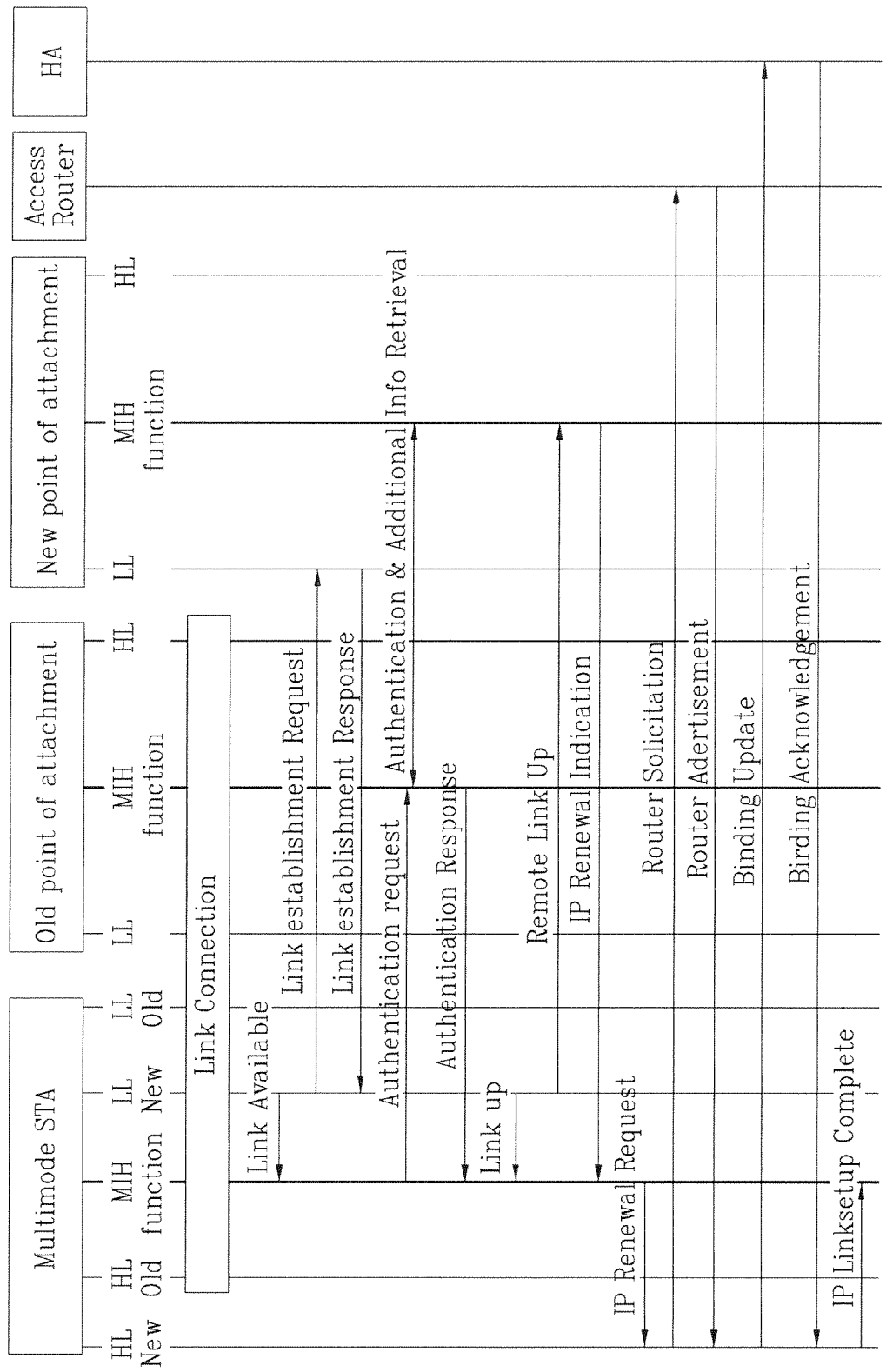
FIG. 20 is a flow chart illustrating a method for re-establishing an address using a non-state-maintenance-type address of the mobile IPv6 system as a temporary address or care of address (CoA) when a mobile terminal is handed over to another interface network such that a subnet is changed, in accordance with one embodiment of the present invention.

FIG. 20 is a flow chart illustrating a method for re-establishing an address using a non-state-maintenance-type address of the mobile IPv6 system as a temporary address (CoA) when a mobile terminal is handed over to another interface network such that a subnet is changed, in accordance with one embodiment of the present invention.

Referring to FIG. 20, if a subnet of the mobile terminal is changed to another subnet, the MIH function of the new point of attachment (POA) transmits the "IP_Renewal_Indication" message for commanding a CoA re-setup process to the MIH function of the mobile terminal. The MIH function of the mobile terminal then transmits the "IP_Renewal_Request" trigger signal to the network layer, such that it commands the network layer to re-establish a CoA. If the network layer of the mobile terminal receives the "IP_Renewal_Request" trigger signal, it transmits a "Router Solicitation" message to an access router to construct a new temporary address (CoA).

Preferably, the router transmits its prefix and other address construction information to the mobile terminal to answer the "Router Solicitation" message of the mobile terminal. The mobile terminal then combines its interface ID with the received prefix information, such that the mobile terminal establishes a CoA. Preferably, the mobile terminal determines the presence or absence of a collision of the constructed CoA using a "Neighbor Solicitation" message and a "NeighborAdvertisement" message. If the mobile terminal does not receive the "Neighbor Advertisement" message during a predetermined period of time, uniqueness of the constructed CoA is authenticated such that the CoA is determined to be available.

The mobile terminal then registers the constructed CoA with the home agent (HA) using a "Binding Update" message. The home agent (HA) transmits a "Binding Acknowledgement" message to answer the "Binding Update" message of the home agent (HA). After the mobile terminal completes the aforementioned HA registration process, the mobile terminal transmits the "IP_Linksetup_Complete" trigger signal to the MIH function of the mobile terminal.

A method for employing a "state-maintenance-type address" of the mobile IPv6 system as a CoA when a mobile terminal is handed over to another interface network will hereinafter be described.

Figure 21:
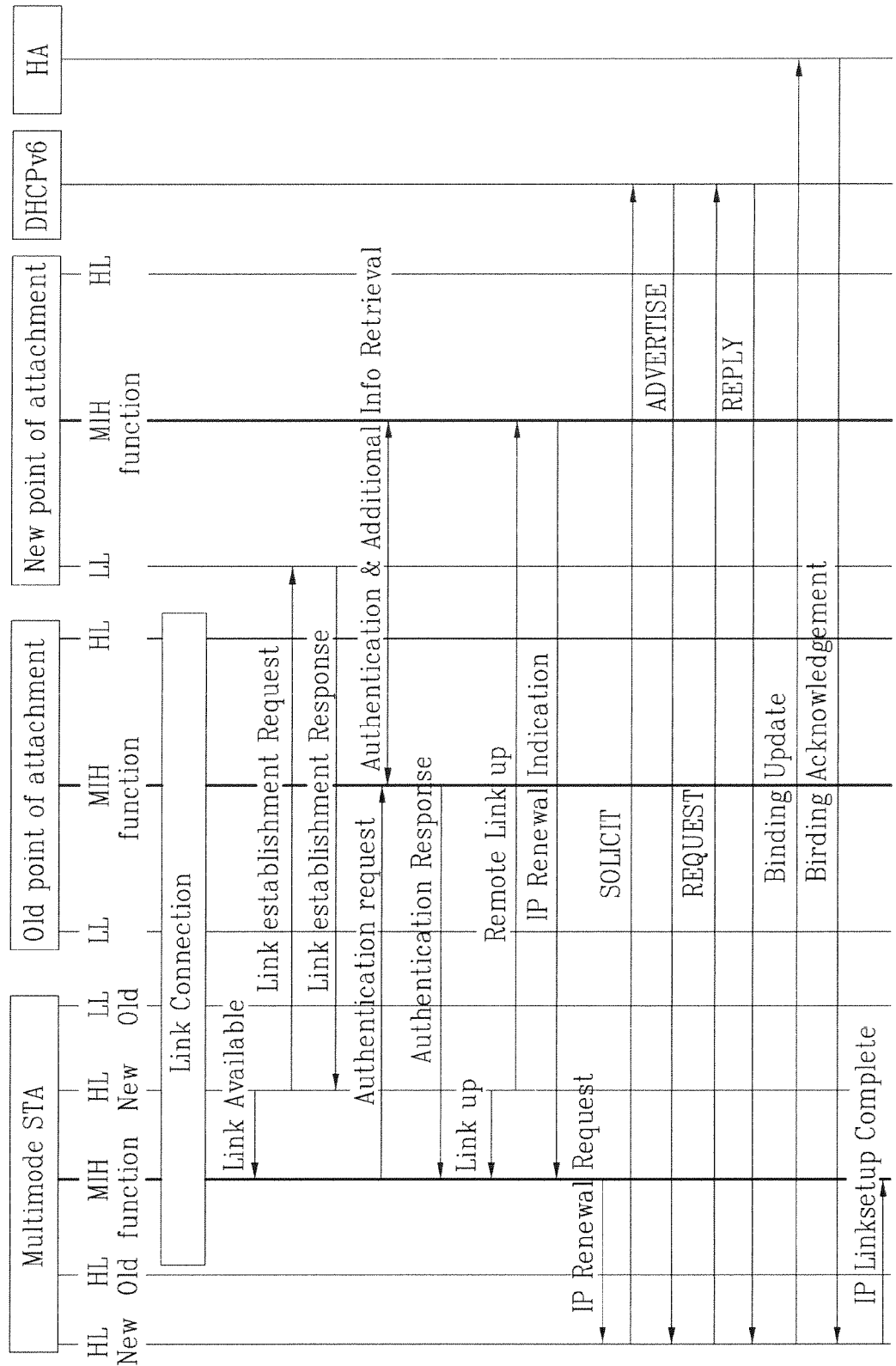
FIG. 21 is a flow chart illustrating a method for re-establishing an address using a state-maintenance-type address of the mobile IPv6 system as a temporary address or care of address (CoA) when a mobile terminal is handed over to another interface network such that a subnet is changed, in accordance with one embodiment of the present invention.

FIG. 21 is a flow chart illustrating a method for re-establishing an address using a state-maintenance-type address of the mobile IPv6 system as a temporary address (CoA) when a mobile terminal is handed over to another interface network such that a subnet is changed, in accordance with one embodiment of the present invention.

Referring to FIG. 21, if a subnet of the mobile terminal is changed to another subnet, the MIH function of the new point of attachment (POA) transmits the "IP_Renewal_Indication" message for commanding a CoA re-setup process to the MIH function of the mobile terminal. The MIH function of the mobile terminal then transmits the "IP_Renewal_Request" trigger signal to the network layer, such that it commands the network layer to re-establish a CoA. If the network layer of the mobile terminal receives the "IP_Renewal_Request" trigger signal, the network layer transmits a "SOLICIT" message to a DHCPv6 server to construct, via a multicast address, a new temporary address (CoA).

The DHCPv6 server then transmits an "ADVERTISE" message to answer the "SOLICIT" message. The mobile terminal having received the "ADVERTISE" message selects an advertising server, and transmits a "REQUEST" message to acquire additional constituent parameters. The DHCPv6 server transmits a "REPLY" message to answer the "REQUEST" message. Preferably, the mobile terminal employs a CoA contained in the "REPLY" message as a temporary address, such that it registers the CoA with the home agent (HA) via the "Binding Update" message.

The home agent (HA) then transmits the "Binding Acknowledgement" message to answer the "Binding Update" message. If the aforementioned CoA setup procedure is completed, the mobile terminal transmits the "IP_Linksetup_Complete" trigger signal to the MIH function of the mobile terminal.

The above-mentioned preferred embodiments have disclosed a variety of methods for re-establishing a temporary address (CoA) using the mobile IPv4 system and the mobile IPv6 system on the condition that the multi-mode mobile terminal is handed over to another interface network so that a subnet is changed. However, although the multi-mode mobile terminal is handed over to another subnet contained in a current access interface network, the aforementioned trigger signals (i.e., IP_Renewal_Indication, IP_Renewal_Request, and IP_Linksetup _Complete) can also be adapted to re-establish a temporary address (CoA).

Figure 22:
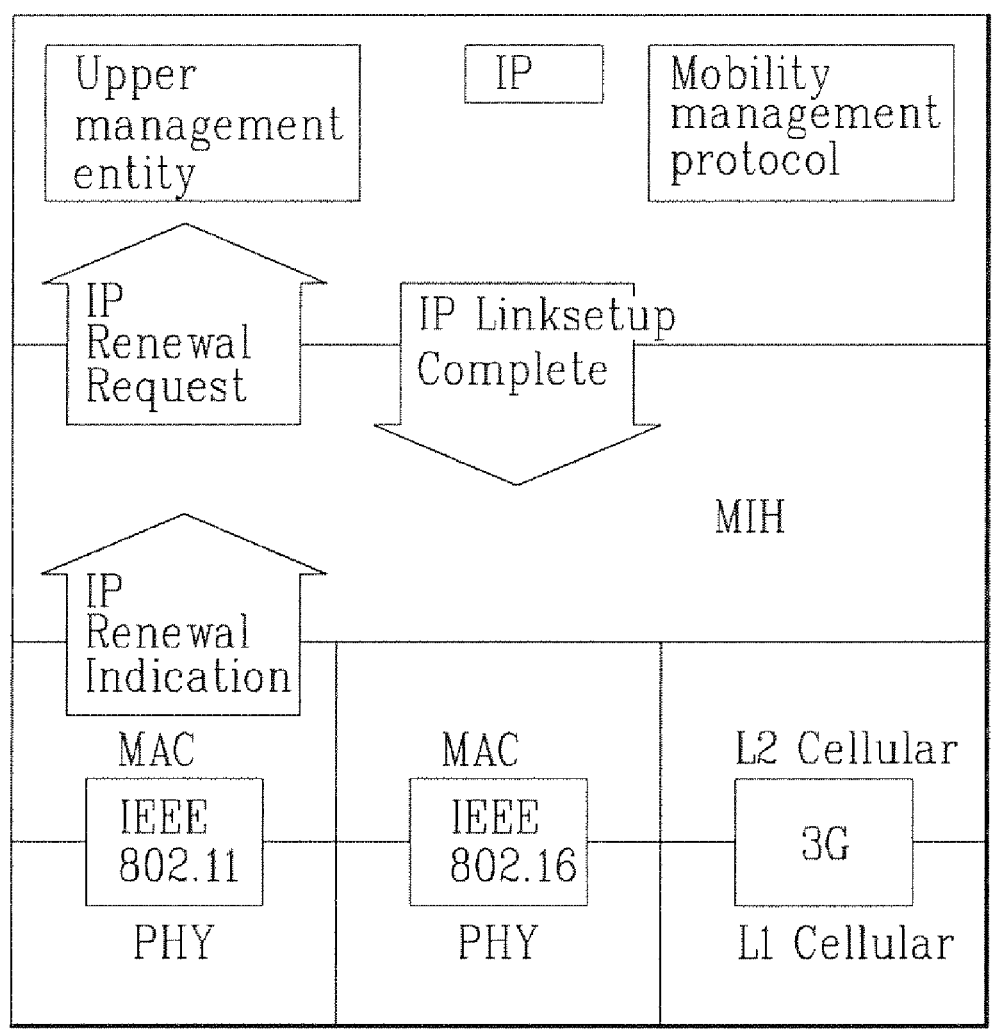
FIG. 22 is a diagram illustrating a protocol stack of a multi-mode mobile terminal, and operations of IP address setup event/command services in accordance with one embodiment of the present invention.

FIG. 22 is a diagram illustrating a protocol stack of a multi-mode mobile terminal, and operations of IP address setup event/command services in accordance with one embodiment of the present invention.

Referring to FIG. 22, if a new network to which the multi-mode mobile terminal is handed over cannot use an IP address of an old network, a MAC layer of the mobile terminal transmits an "IP_Renewal_Indication" message to the MIH function of the mobile terminal. Upon receiving the "IP_Renewal_ Indication" message, the MIH function transmits an "IP_Renewal_Request" message acting as an MIH event to an upper management entity of the mobile terminal. By doing so, the MIH function preferably commands the upper management entity to establish an IP address. The upper management entity having received the "IP_Renewal_Request" message completes the IP address setup process via an IP layer, transmits an "IP_LinkSetup_Complete" message acting as an MIH command to the MIH function, and informs the MIH function of the IP address setup completion.

Figure 23:
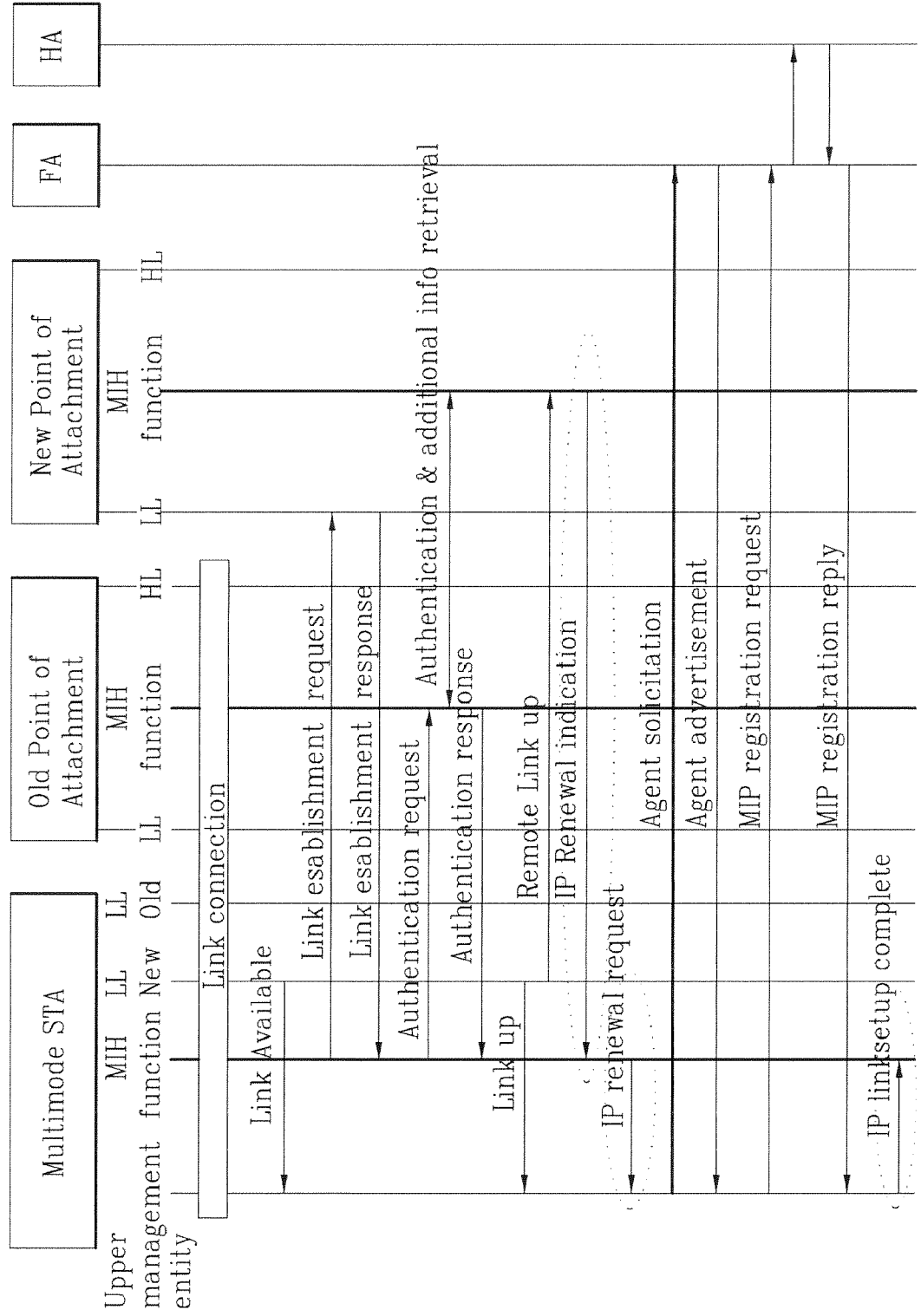
FIG. 23 is a flow chart illustrating a method for allowing an upper management entity to re-establish an IP address using a "FA-CoA" of the mobile IPv4 system as a temporary address or care of address (CoA) when a mobile terminal is handed over to another interface network such that a subnet is changed, in accordance with one embodiment of the present invention.

FIG. 23 is a flow chart illustrating a method for allowing an upper management entity to re-establish an IP address using a "FA-CoA" of the mobile IPv4 system as a temporary address (CoA) when a mobile terminal is handed over to another interface network such that a subnet is changed, in accordance with one embodiment of the present invention.

Referring to FIG. 23, the mobile terminal establishes a connection state with a link of a current interface network. If a high-quality link is detected from a lower layer (LL), such as a MAC layer of a new interface network, the mobile terminal transmits a "Link_Available" trigger signal to an MIH function of the mobile terminal. The new MAC layer then establishes a connection state with a new point of attachment (POA). If the new MAC layer establishes the connection state with the new POA, the new MAC layer performs an authentication process, and informs the MIH function of the mobile terminal and the MIH function of the new POA of the link setup state.

Preferably, the MIH function of the new point of attachment (POA) then transmits an "IP_Renewal_Indication" message acting as a link event for commanding a CoA re-setup process to the MIH function of the mobile terminal when a subnet of the mobile terminal is changed to another subnet. The mobile terminal's MIH function having received the "IP_Renewal_Indication" message transmits an "IP_Renewal_Request" message to the upper management entity, such that it commands the upper management entity to re-establish a CoA.

If the upper management entity of the mobile terminal receives the "IP_Renewal_Request" message acting as an MIH event, the upper management entity transmits an "Agent Solicitation" message to a foreign agent (FA) to acquire a new temporary address (CoA). The foreign agent (FA) then transmits an "Agent_Advertisement" message to the mobile terminal to answer the "Agent Solicitation" message. A network layer of the mobile terminal registers a temporary address (CoA) with a home agent (HA) upon receiving the "Agent_Advertisement" message. Preferably, if the CoA re-setup process is completed, the upper management entity of the mobile terminal transmits an "IP_Linksetup_Complete" MIH command to the MIH function of the mobile terminal.

Figure 24:
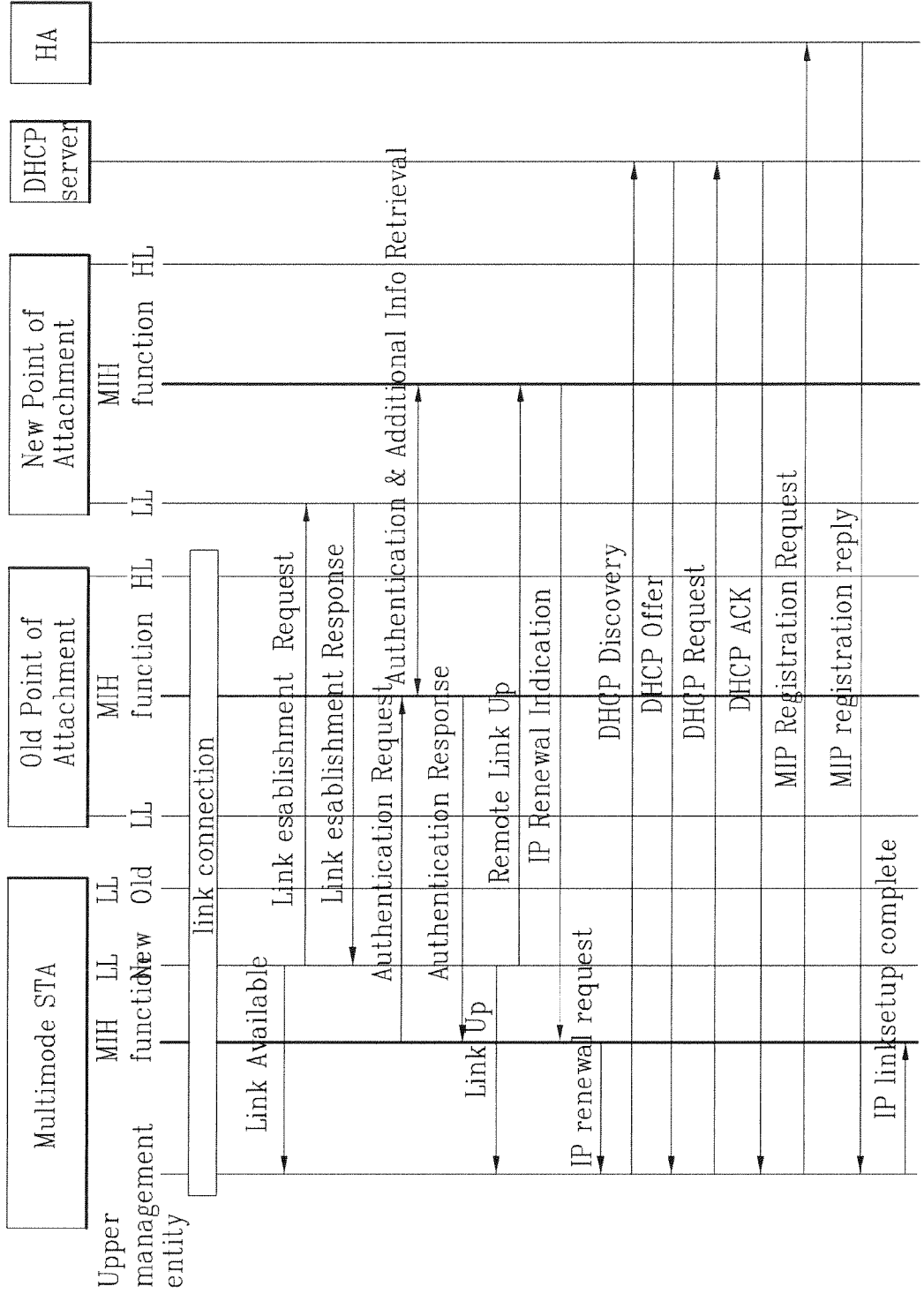
FIG. 24 is a flow chart illustrating a method for allowing an upper management entity to re-establish an address using a "co-located CoA" of the mobile IPv4 system as a temporary address or care of address (CoA) when a mobile terminal is handed over to another interface network such that a subnet is changed, in accordance with one embodiment of the present invention.

FIG. 24 is a flow chart illustrating a method for allowing an upper management entity to re-establish an address using a "co-located CoA" of the mobile IPv4 system as a temporary address (CoA) when a mobile terminal is handed over to another interface network such that a subnet is changed, in accordance with one embodiment of the present invention.

Referring to FIG. 24, if the mobile terminal re-establishes an IP temporary address (CoA) using the "co-located CoA", and receives the "IP_Renewal_Indication" message (acting as a link event) indicative of a CoA re-setup state from the MIH function of a new point of attachment (POA), the MIH function of the mobile terminal transmits the "IP_Renewal_ Request" message to the upper management entity of the mobile terminal. Upon receiving the "IP_Renewal_Request" message, the upper management entity transmits a "DHCP Discovery" message to receive a temporary address (CoA). If the upper management entity receives the temporary address (CoA) according to a DHCP address allocation procedure, the mobile terminal registers the received CoA with a home agent (HA).

If the upper management entity of the mobile terminal registers the CoA in the home agent (HA) via the IP layer, the upper management entity transmits the "IP_Linksetup_Complete" message, acting as an MIH command, to the MIH function of the mobile terminal.

Figure 25:
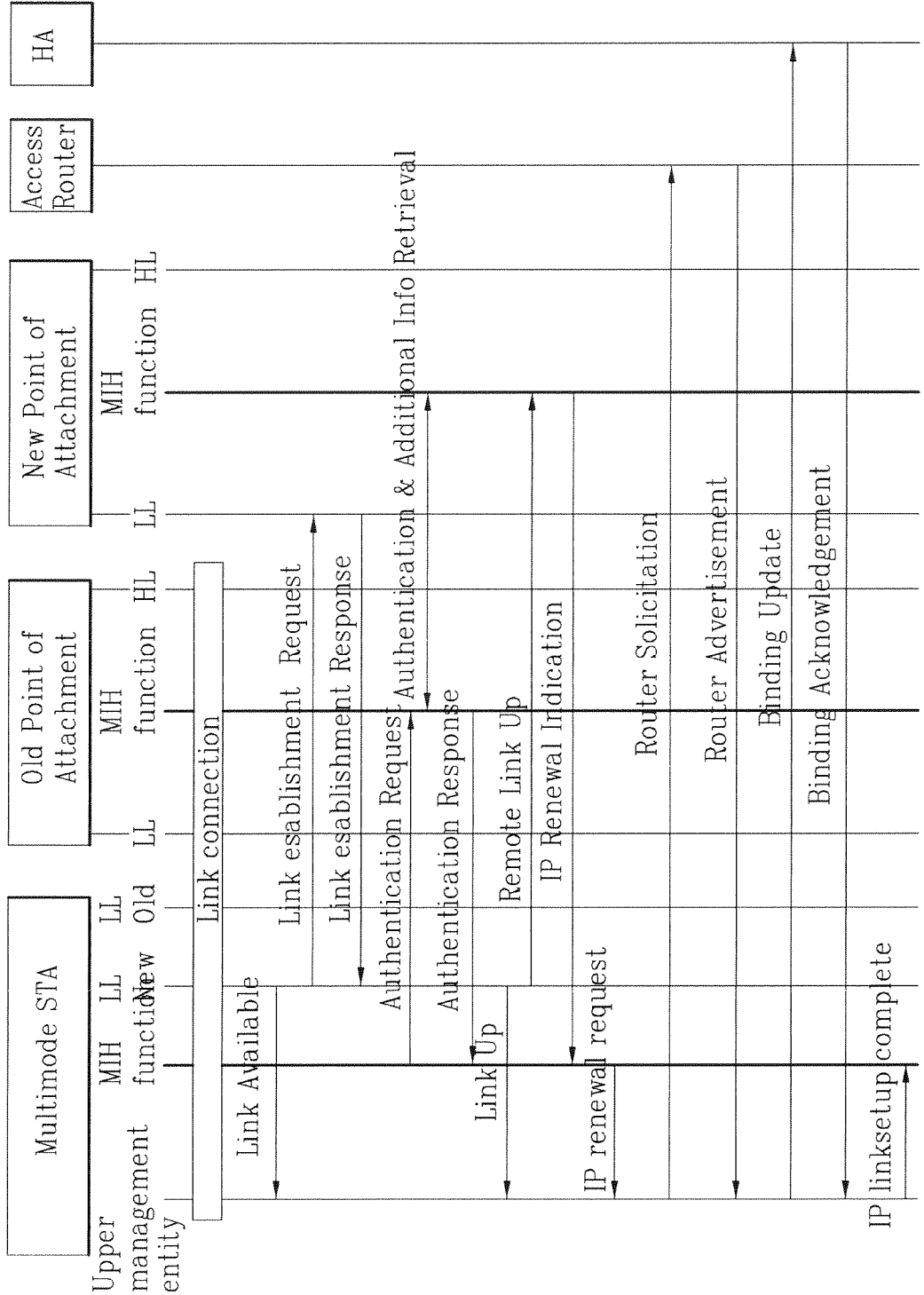
FIG. 25 is a flow chart illustrating a method for allowing an upper management entity to re-establish an address using a non-state-maintenance-type address of the mobile IPv6 system as a temporary address or care of address (CoA) when a mobile terminal is handed over to another interface network such that a subnet is changed, in accordance with one embodiment of the present invention.

FIG. 25 is a flow chart illustrating a method for allowing an upper management entity to re-establish an address using a non-state-maintenance-type address of the mobile IPv6 as a temporary address (CoA) when a mobile terminal is handed over to another interface network such that a subnet is changed, according to the present invention.

Referring to FIG. 25, if a subnet of the mobile terminal is changed to another subnet, the MIH function of the new point of attachment (POA) transmits the "IP_Renewal_Indication" message acting as a link event for commanding a CoA re-setup process to the MIH function of the mobile terminal. The MIH function of the mobile terminal then transmits the "IP_Renewal_Request" message to the upper management entity, such that it commands the upper management entity to re-establish a CoA via the IP layer. If the upper management entity receives the "IP_Renewal_Request" message, the upper management entity transmits a "Router Solicitation" message to an access router to construct a new temporary address (CoA).

Preferably, the router transmits its prefix and other address construction information to the mobile terminal to answer the "Router Solicitation" message of the mobile terminal. The mobile terminal combines its interface ID with the received prefix information, such that the mobile terminal establishes a CoA. Preferably, the mobile terminal determines the presence or absence of a collision of the constructed CoA using a "Neighbor Solicitation" message and a "Neighbor Advertisement" message. If the mobile terminal does not receive the "Neighbor Advertisement" message during a predetermined period of time, uniqueness of the constructed CoA is authenticated such that the constructed CoA is determined to be available.

The mobile terminal registers its CoA with the home agent (HA) using the "Binding Update" message. The home agent (HA) then transmits the "Binding Acknowledgement" message to answer the "Binding Update" message. After the mobile terminal completes the aforementioned HA registration process, the mobile terminal transmits the "IP_Linksetup_Complete" message, acting as an MIH command, to the MIH function of the mobile terminal.

Figure 26:
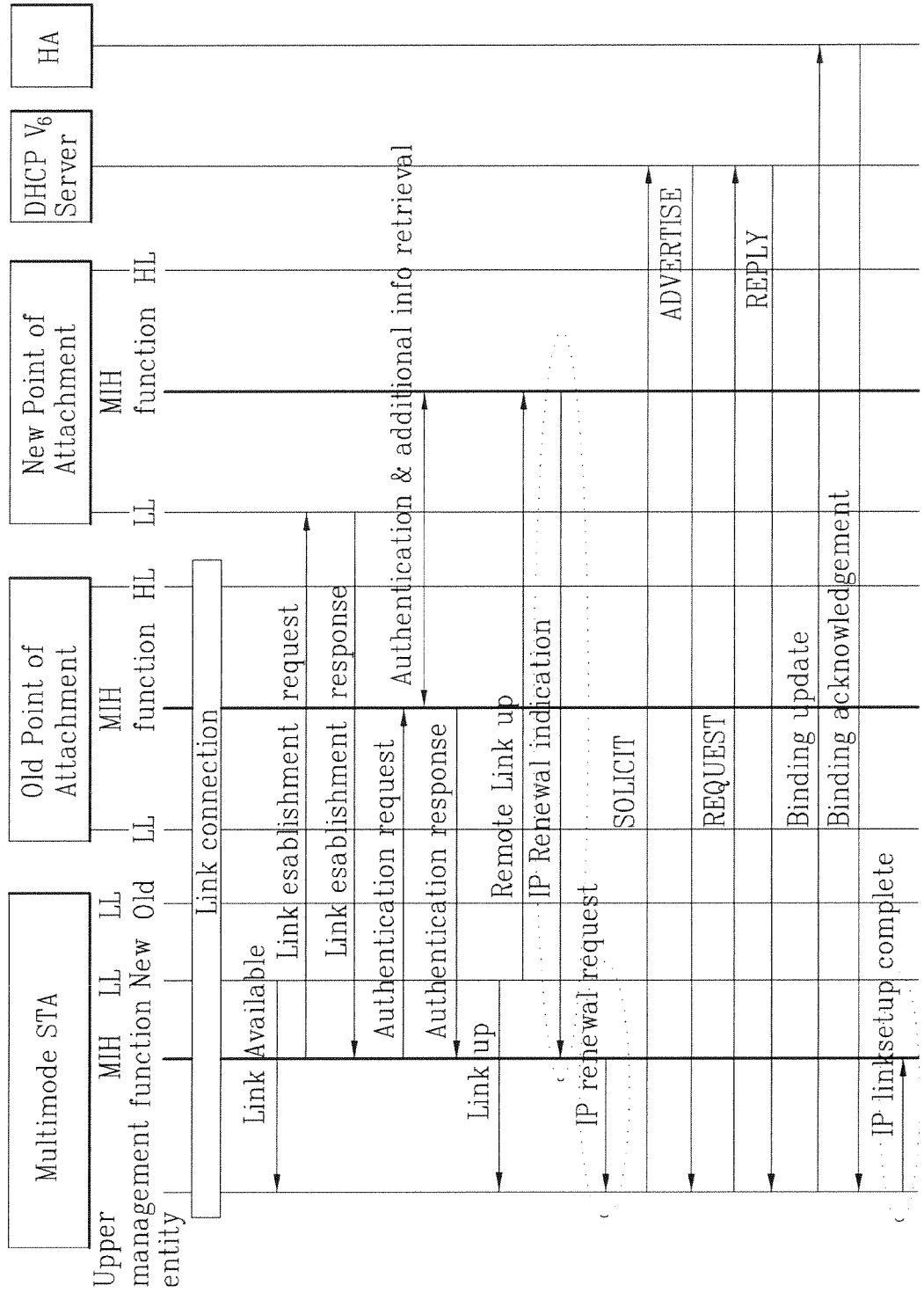
FIG. 26 is a flow chart illustrating a method for allowing an upper management entity to re-establish an address using a state-maintenance-type address of the mobile IPv6 system as a temporary address or care of address (CoA) when a mobile terminal is handed over to another interface network such that a subnet is changed, in accordance with one embodiment of the present invention.

FIG. 26 is a flow chart illustrating a method for allowing an upper management entity to re-establish an address using a state-maintenance-type address of the mobile IPv6 system as a temporary address (CoA) when a mobile terminal is handed over to another interface network such that a subnet is changed, in accordance with one embodiment of the present invention.

Referring to FIG. 26, if a subnet of the mobile terminal is changed to another subnet, the MIH function of the new point of attachment (POA) transmits the "IP_Renewal_Indication" message (acting as a link event) for commanding a CoA re-setup process to the MIH function of the mobile terminal. The MIH function of the mobile terminal then transmits the "IP_Renewal_Request" message acting as an MIH event to the upper management entity, such that it commands the upper management entity to re-establish a CoA. If the upper management entity receives the "IP_Renewal_Request" message, the upper management entity transmits a "SOLICIT" message to a DHCPv6 server to construct, via a multicast address, a new temporary address (CoA).

The DHCPv6 server then transmits an "ADVERTISE" message to the mobile terminal to answer the "SOLICIT" message. The mobile terminal having received the "ADVERTISE" message selects an advertising server, and transmits a "REQUEST" message to acquire additional constituent parameters. The DHCPv6 server then transmits a "REPLY" message to answer the "REQUEST" message. Preferably, the mobile terminal employs a CoA contained in the "REPLY" message as a temporary address, such that it registers the CoA with the home agent (HA) via the "Binding Update" message.

The home agent (HA) then transmits the "Binding Acknowledgement" message to answer the "Binding Update" message. If the aforementioned CoA setup procedure is completed, the upper management entity of the mobile terminal transmits the "IP_Linksetup_Complete" message, acting as an MIH command, to the MIH function of the mobile terminal.

Figure 27:
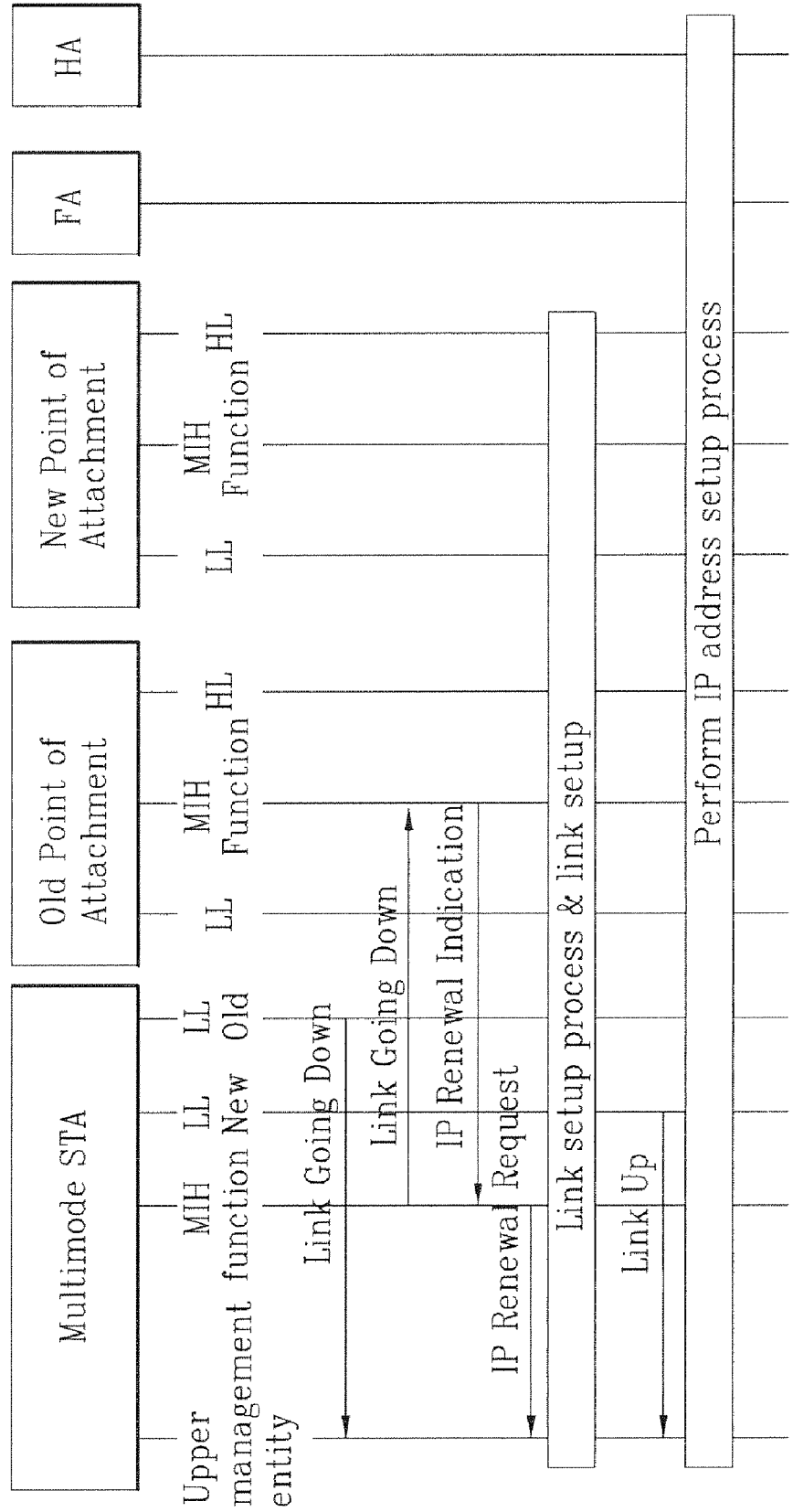
FIG. 27 is a flow chart illustrating a method for receiving specific information indicating that a subnet is to be changed from an old point of attachment (POA) before a mobile terminal is handed over to another interface network in accordance with one embodiment of the present invention.

FIG. 27 is a flow chart illustrating a method for receiving specific information indicating that a subnet is to be changed from an old point of attachment (POA) before a mobile terminal is handed over to another interface network in accordance with one embodiment of the present invention. FIG. 27 also illustrates a method for performing an IP address re-setup procedure after the mobile terminal is handed over to another interface network in accordance with one embodiment of the present invention.

Referring to FIG. 27, if handover of the mobile terminal is required due to a deteriorating link quality at an old point of attachment (POA), the mobile terminal informs the upper management entity and an MIH function of a current point of attachment (POA) of the deteriorating link quality via a remote "Link_Going_Down" message.

If the old point of attachment (POA) recognizes specific information indicating whether an IP address for communication must be changed after the mobile terminal has moved to a new point of attachment (POA), the old POA informs the MIH function of the mobile terminal of the specific information via an "IP_Renewal_Indication" message. The mobile terminal may then directly inform the upper management entity of the specific information. Alternatively, the mobile terminal may indirectly inform the upper management entity of the specific information via an "IP_Renewal_Request" message. If the mobile terminal establishes a link state with the new POA using the link setup procedure, the mobile terminal quickly performs the IP address setup procedure by referring to IP address setup information acquired from the old POA.

The above-mentioned preferred embodiments have disclosed a variety of methods for re-establishing a temporary address (CoA) using the mobile IPv4 system and the mobile IPv6 system on the condition that the multi-mode mobile terminal is handed over to another interface network so that a subnet is changed. However, although the multi-mode mobile terminal is handed over to another subnet contained in a current access interface network, the aforementioned trigger signals (i.e., IP_Renewal_Indication, IP_Renewal_Request, and IP_Linksetup _Complete) can also be adapted to re-establish a temporary address (CoA).

As apparent from the above description, a method for re-establishing a temporary IP address according to the present invention quickly re-establishes an IP temporary address without encountering a time delay, on the condition that a multi-mode mobile terminal is handed over from one subnet to another subnet in a network, or is handed over to another interface network such that a subnet is changed.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for establishing a network address of a mobile terminal in a mobile communication system, the method comprising:

performing handover of the mobile terminal to at least one of a homogeneous network and a heterogeneous network through a media independent handover function (MIHF) module of the mobile terminal, the MIHF module configured to provide convergence of information from at least one network interface module associated with one of a homogeneous and heterogeneous network into a unified presentation and deliver the converged information in the unified presentation to an upper layer of the mobile terminal; and sending an indication to the upper layer of the mobile terminal from the MIHF module of the mobile terminal for indicating whether a network address of the mobile terminal needs to be changed for communicating data prior to establishing the network address for the at least one of a homogeneous and a heterogeneous network.

2. The method of claim 1, further comprising:
establishing the network address for the at least one of a homogeneous network and a heterogeneous network, wherein the network address is an Internet protocol (IP) address.

3. The method of claim 1, wherein the step of sending an indication to the upper layer of the mobile terminal occurs when a subnet of the mobile terminal has changed.

4. The method of claim 1, wherein the step of performing handover comprises performing handover from a medium access control layer of a current network to a medium access control layer of the at least one of a homogeneous network and a heterogeneous network.

5. The method of claim 4, wherein the homogeneous network is the current network.

6. The method of claim 1, further comprising:
receiving in the MIHF module of the mobile terminal an indication from a lower layer of the mobile terminal for indicating whether the network address of the mobile terminal needs to be changed for communicating data,
wherein the step of sending an indication to the upper layer of the mobile terminal is to notify the upper layer of the indication sent from the lower layer.

7. The method of claim 1, further comprising:
transmitting an indication from a lower layer of the mobile terminal to the MIHF module of the mobile terminal for indicating whether the network address of the mobile terminal needs to be changed for communicating data.

8. The method of claim 1, further comprising:
receiving in the MIHF module of the mobile terminal an indication message sent from a remote MIHF module to indicate whether the network address of the mobile terminal needs to be changed for communicating data,
wherein the step of sending an indication to the upper layer of the mobile terminal is a result of the receipt of the indication message sent from the remote MIHF module.

9. The method of claim 1, wherein the upper layer comprises at least one of a mobility management protocol and an upper management entity.

10. The method of claim 2, further comprising informing the MIHF module of the mobile terminal from the upper layer that the network address for the at least one of a homogeneous network and a heterogeneous network is established.

11. The method of claim 6, further comprising:
transmitting an indication from the lower layer of the mobile terminal to the MIHF module of the mobile terminal for indicating whether the network address of the mobile terminal needs to be changed for communicating data.

12. The method of claim 2, wherein the step of establishing the IP address for the at least one of a homogeneous network and a heterogeneous network comprises:
soliciting a foreign agent of the at least one of a homogeneous network and a heterogeneous network for the IP address;
receiving the IP address from the foreign agent; and
registering the IP address for the at least one of a homogeneous network and a heterogeneous network with a home agent of a home network.

13. The method of claim 12, wherein the IP address is a care of address (CoA).

14. The method of claim 2, wherein the step of establishing the IP address for the at least one of a homogeneous network and a heterogeneous network comprises:
discovering and selecting a dynamic host configuration protocol (DHCP) server of the at least one of a homogeneous network and a heterogeneous network;
requesting from the DHCP server the IP address for the at least one of a homogeneous network and a heterogeneous network;
receiving the IP address from the DHCP server; and
registering the IP address with a home agent of a home network.

15. The method of claim 14, wherein the IP address is a care of address (CoA).

16. The method of claim 2, wherein the step of establishing the IP address for the at least one of a homogeneous network and a heterogeneous network comprises:
soliciting an access router of the at least one of a homogeneous network and a heterogeneous network for prefix information related to the construction of the IP address for the at least one of a homogeneous network and a heterogeneous network;

receiving the prefix information from the access router;

constructing the IP address using the received prefix information; and registering the IP address with a home agent of a home network.

17. The method of claim 16, wherein the IP address is a care of address (CoA).

18. The method of claim 2, wherein the step of establishing the IP address for the at least one of a homogeneous network and a heterogeneous network comprises:

discovering and selecting a dynamic host configuration protocol v6 (DHCP v6) server of the at least one of a homogeneous network and a heterogeneous network;

requesting from the DHCP v6 server the IP address for the at least one of a homogeneous network and a heterogeneous network;

receiving the IP address from the DHCP v6 server; and registering the IP address with a home agent of a home network.

19. The method of claim 18, wherein the IP address is a care of address (CoA).

20. The method of claim 1, wherein the step of sending an indication to the upper layer of the mobile terminal from the MIHF module of the mobile terminal occurs prior to performing handover.

21. The method of claim 20, further comprising:

receiving in the MIHF module of the mobile terminal an indication from a lower layer of the mobile terminal for indicating whether the network address of the mobile terminal needs to be changed for communicating data, wherein the step of sending an indication to the upper layer of the mobile terminal is to notify the upper layer of the indication sent from the lower layer.

22. The method of claim 21, further comprising establishing a connection with the at least one of a homogeneous network and a heterogeneous network.

23. The method of claim 22, wherein the step of establishing a connection comprises establishing a connection between a medium access control layer of the mobile terminal and a medium access control layer of the at least one of a homogeneous network and a heterogeneous network.

24. The method of claim 20, further comprising:

establishing the network address for the at least one of a homogeneous network and a heterogeneous network, wherein the network address is an Internet protocol (IP) address.

25. The method of claim 20, wherein the step of sending an indication to the upper layer of the mobile terminal from the MIHF module of the mobile terminal occurs when a subnet of the mobile terminal has changed.

26. The method of claim 20, wherein the step of performing handover comprises performing handover from a medium access control layer of a current network to a medium access control layer of the at least one of a homogeneous network and a heterogeneous network.

27. The method of claim 20, further comprising:

transmitting an indication from a lower layer of the mobile terminal to the MIHF module of the mobile terminal for indicating whether the network address of the mobile terminal needs to be changed for the at least one of a homogeneous network and a heterogeneous network for communicating data.

28. The method of claim 20, further comprising:

receiving in the MIHF module of the mobile terminal an indication message sent from a remote MIHF module to indicate whether the network address of the mobile terminal needs to be changed for communicating data, wherein the step of sending and indication to the upper layer of the mobile terminal is a result of the receipt of the indication message sent from the remote MIHF module.

29. The method of claim 20, wherein the upper layer comprises at least one of a mobility management protocol and an upper management entity.

30. The method of claim 20, further comprising informing the MIHF module of the mobile terminal from the upper layer that the network address for the at least one of a homogeneous network and a heterogeneous network is established.

31. The method of claim 21, further comprising:

transmitting an indication from the lower layer of the mobile terminal to the MIHF module of the mobile terminal for indicating whether the network address of the mobile terminal needs to be changed for communicating data.

32. The method of claim 24, wherein the step of establishing the IP address for the at least one of a homogeneous network and a heterogeneous network comprises:

soliciting a foreign agent of the at least one of a homogeneous network and a heterogeneous network for the IP address;

receiving the IP address from the foreign agent; and registering the IP address for the at least one of a homogeneous network and a heterogeneous network with a home agent of a home network.

33. The method of claim 32, wherein the IP address is a care of address (CoA).

34. The method of claim 24, wherein the step of establishing the IP address for the at least one of a homogeneous network and a heterogeneous network comprises:

discovering and selecting a dynamic host configuration protocol (DHCP) server of the at least one of a homogeneous network and a heterogeneous network;

requesting from the DHCP server the IP address for the at least one of a homogeneous network and a heterogeneous network;

receiving the IP address from the DHCP server; and registering the IP address with a home agent of a home network.

35. The method of claim 34, wherein the IP address is a care of address (CoA).

36. The method of claim 24, wherein the step of establishing the IP address for the at least one of a homogeneous network and a heterogeneous network comprises:

soliciting an access router of the at least one of a homogeneous network and a heterogeneous network for prefix information related to the construction of the IP address for the at least one of a homogeneous network and a heterogeneous network;

receiving the prefix information from the access router;

constructing the IP address using the received prefix information; and registering the IP address with a home agent of a home network.

37. The method of claim 36, wherein the IP address is a care of address (CoA).

38. The method of claim 24, wherein the step of establishing the IP address for the at least one of a homogeneous network and a heterogeneous network comprises:

discovering and selecting a dynamic host configuration protocol v6 (DHCP v6) server of the at least one of a homogeneous network and a heterogeneous network;

requesting from the DHCP v6 server the IP address for the at least one of a homogeneous network and a heterogeneous network;

receiving the IP address from the DHCP v6 server; and registering the IP address with a home agent of a home network.

39. The method of claim 38, wherein the IP address is a care of address (CoA).

40. A mobile terminal capable of establishing a network address in a mobile communication system, the mobile terminal comprising:

a media independent handover function (MIHF) module configured to provide convergence of information from at least one network interface module associated with one of a homogeneous and heterogeneous network into a unified presentation and deliver the converged information in the unified presentation to an upper layer of the mobile terminal, wherein the MIHF module performs handover of the mobile terminal to the at least one of a homogeneous network and a heterogeneous network, wherein the MIHF module sends an indication to the upper layer of the mobile terminal for indicating whether a network address of the mobile terminal needs to be changed for communicating data prior to establishing the network address for the at least one of a homogeneous and heterogeneous network.

41. The mobile terminal of claim 40, wherein the upper layer of the mobile terminal establishes the network address for the at least one of a homogeneous network and a heterogeneous network, wherein the network address is an Internet protocol (IP) address.

42. The mobile terminal of claim 40, wherein the MIHF module sends an indication to the upper layer of the mobile terminal when a subnet of the mobile terminal has changed.

43. The mobile terminal of claim 40, wherein the MIHF module performs handover from a medium access control layer of a current network to a medium access control layer of the at least one of a homogeneous network and a heterogeneous network.

44. The mobile terminal of claim 43, wherein the homogeneous network is the current network.

45. The mobile terminal of claim 40, wherein the MIHF module receives an indication from a lower layer of the mobile terminal for indicating whether the network address of the mobile terminal needs to be changed for communicating data, and wherein the MIHF module sends the indication to the upper layer of the mobile terminal to notify the upper layer of the indication sent from the lower layer.

46. The mobile terminal of claim 40, further comprising a lower layer of the mobile terminal for transmitting an indication to the MIHF module for indicating whether the network address of the mobile terminal needs to be changed for communicating data.

47. The mobile terminal of claim 40, wherein the MIHF module receives an indication message sent from a remote MIHF module to indicate whether the network address of the mobile terminal needs to be changed for communicating data, and wherein the MIHF module sends an indication to the upper layer of the mobile terminal as a result of the receipt of the indication message sent from the remote MIHF module.

48. The mobile terminal of claim 40, wherein the upper layer comprises at least one of a mobility management protocol and an upper management entity.

49. The mobile terminal of claim 40, wherein the upper layer of the mobile terminal informs the MIHF module that the network address for the at least one of a homogeneous network and a heterogeneous network is established.

50. The mobile terminal of claim 45, wherein the lower layer of the mobile terminal transmits to the MIHF module an indication indicating whether the network address of the mobile terminal needs to be changed for communicating data.

* * * * *